US011137719B2

(12) United States Patent
Chakravarthula et al.

(10) Patent No.: US 11,137,719 B2
(45) Date of Patent: Oct. 5, 2021

(54) METHODS, SYSTEMS, AND COMPUTER READABLE MEDIA FOR IMPROVED DIGITAL HOLOGRAPHY AND DISPLAY INCORPORATING SAME

(71) Applicant: The University of North Carolina at Chapel Hill, Chapel Hill, NC (US)

(72) Inventors: Praneeth Kumar Chakravarthula, Carrboro, NC (US); Felix Heide, Palo Alto, CA (US)

(73) Assignee: UNIVERSITY OF NORTH CAROLINA AT CHAPEL HILL, Chapel Hill, NC (US)

(*) Notice: Subject to any disclaimer, the term of this patent is extended or adjusted under 35 U.S.C. 154(b) by 0 days.

(21) Appl. No.: 16/710,845

(22) Filed: Dec. 11, 2019

(65) Prior Publication Data
US 2020/0192287 A1 Jun. 18, 2020

Related U.S. Application Data

(60) Provisional application No. 62/778,253, filed on Dec. 11, 2018.

(51) Int. Cl.
*G03H 1/02* (2006.01)
*G03H 1/08* (2006.01)

(52) U.S. Cl.
CPC ......... *G03H 1/0866* (2013.01); *G03H 1/0808* (2013.01); *G03H 2226/02* (2013.01); *G03H 2240/61* (2013.01); *G03H 2240/62* (2013.01)

(58) Field of Classification Search
CPC ...... G03H 1/08; G03H 1/2205; G03H 1/0808; G03H 1/0866; G03H 1/2294; G03H 2240/61; G03H 2240/62; G03H 2226/02; G03H 2225/32; G03H 2225/60;
(Continued)

(56) References Cited

U.S. PATENT DOCUMENTS 3,606,515 A * 9/1971 Hirsch ............... G03H 1/08
    359/9
2001/0050787 A1* 12/2001 Crossland ............. G02F 1/31
    359/15
(Continued)

OTHER PUBLICATIONS

Performance Predictions for Parameter Estimators That Minimize Cost-Functions Using Wirtinger Calculus With Application to CM Blind Equalization, Demissie, IEEE Transactions on Signal Processing, vol. 59, No. 8, Aug. 2011. (Year: 2011).*
(Continued)

*Primary Examiner* — Audrey Y Chang
(74) *Attorney, Agent, or Firm* — Jenkins, Wilson, Taylor & Hunt, P.A.

(57) ABSTRACT

A method for digital holography includes modeling a hologram using a forward propagation model that models propagation of a light field from a hologram plane to an image plane. The method further includes computing the hologram as a solution to an optimization problem that is based on the model. The method further includes configuring at least one spatial light modulator using the hologram. The method further includes illuminating the spatial light modulator using a light source to create a target image.

27 Claims, 25 Drawing Sheets
(22 of 25 Drawing Sheet(s) Filed in Color)

(58) Field of Classification Search
CPC ..... G03H 2001/2207; G03H 2001/261; G03H 2001/0816; G02F 1/31
USPC ....................................................... 359/9, 15
See application file for complete search history.

(56) References Cited

U.S. PATENT DOCUMENTS

| | | | | |
|---|---|---|---|---|
| 2009/0101807 | A1* | 4/2009 | Grier | G03H 1/08 250/251 |
| 2011/0157667 | A1* | 6/2011 | Lacoste | G03H 1/2205 359/9 |
| 2019/0294108 | A1 | 9/2019 | Ozcan et al. | |
| 2019/0317451 | A1 | 10/2019 | Supikov et al. | |

OTHER PUBLICATIONS

Chakravarthula et al., "FocusAR: Auto-focus Augmented Reality Eyeglasses for both Real World and Virtual Imagery," IEEE Transactions on Visualization and Computer Graphics, vol. 24, No. 11, pp. 2906-2916 (Sep. 2018).
Metzler et al., "prDeep: Robust Phase Retrieval with a Flexible Deep Network," International Conference on Machine Learning, arXiv:1803.00212v2, 10 pages (Jun. 2018).
Goldstein et al., "PhaseMax: Convex Phase Retrieval via Basis Pursuit," IEEE Transactions on Information Theory, arXiv:1610.07531v3, pp. 2675-2689 (Jan. 30, 2018).
Zhang et al., "The Unreasonable Effectiveness of Deep Features as a Perceptual Metric," The Unreasonable Effectiveness of Deep Features as a Perceptual Metric, pp. 586-595 (2018).
Cholewiak et al., "ChromaBlur: Rendering Chromatic Eye Aberration Improves Accommodation and Realism," ACM Transactions on Graphics, vol. 36, No. 6, p. 210:1-210:12 (Nov. 2017).
Peng et al., "Mix-and-match holography," ACM Transactions on Graphics, vol. 36, No. 6, p. 191:1-191:12 (Nov. 2017).
Shi et al., "Near-eye Light Field Holographic Rendering with Spherical Waves for Wide Field of View Interactive 3D Computer Graphics," ACM Transactions on Graphics, vol. 36, No. 6, p. 236:1-236:17 (Nov. 2017).
Zhang et al., "3D computer-generated holography by non-convex optimization," Optica, vol. 4, No. 10, pp. 1306-1313 (Oct. 2017).
Qian et al., "Inexact Alternating Optimization for Phase Retrieval in the Presence of Outliers," IEEE Transactions on Signal Processing, vol. 65, No. 22, pp. 1-14 (Jul. 24, 2017).
Maimone et al., "Holographic Near-Eye Displays for Virtual and Augmented Reality," ACM Transactions on Graphics, vol. 36, No. 4, p. 85:1-85:16 (Jul. 2017).
Bahmani et al., "Phase Retrieval Meets Statistical Learning Theory: A Flexible Convex Relaxation," arXiv:1610.04210v2, pp. 1-17 (Mar. 16, 2017).
Abadi et al., "TensorFlow: A System for Large-Scale Machine Learning," 12th USENIX Symposium on Operating Systems Design and Implementation (OSDI), pp. 265-283 (Nov. 2-4, 2016).
Yoshikawa et al., "Image quality evaluation and control of computer-generated holograms," Proceedings of the Society of Photo-Optical Instrumentation Engineers, vol. 9771, p. 97710N-1-97710N-9 (Mar. 7, 2016).
Zhang et al., "Layered holographic stereogram based on inverse Fresnel diffraction," Applied Optics, vol. 55, No. 3, pp. A154-A159 (Jan. 20, 2016).
Candès et al., "Phase Retrieval via Wirtinger Flow: Theory and Algorithms," IEEE Transactions on Information Theory, arXiv:1407.1065v3, pp. 1-42 (Nov. 24, 2015).
Zhao et al., "Accurate calculation of computer-generated holograms using angular-spectrum layer-oriented method," Optics Express, vol. 23, No. 20, p. 25440-25449 (Oct. 2015).
Huang et al., "The Light Field Stereoscope: Immersive Computer Graphics via Factored Near-Eye Light Field Displays with Focus Cues," ACM Transactions on Graphics, vol. 34, No. 4, p. 60:1-60:8 (Aug. 2015).

Chen et al., "Improved layer-based method for rapid hologram generation and real-time interactive holographic display applications," Optics Express, vol. 23, No. 14, p. 18143-18155 (Jul. 2015).
Marchesini et al., "Alternating projection, ptychographic imaging and phase synchronization," Applied and Computational Harmonic Analysis, arXiv:1402.0550v3, pp. 1-41 (Jul. 20, 2015).
Zhang et al., "Fully computed holographic stereogram based algorithm for computer-generated holograms with accurate depth cues," Optics Express, vol. 23, No. 4, pp. 3901-3913 (Feb. 23, 2015).
Huang et al., "Single Image Super-resolution from Transformed Self-Exemplars," Proceedings of the IEEE Conference on Computer Vision and Pattern Recognition, pp. 5197-5206 (2015).
Jia et al., "Fast and effective occlusion culling for 3D holographic displays by inverse orthographic projection with low angular sampling," Applied Optics, vol. 53, No. 27, pp. 6287-6293 (Sep. 20, 2014).
Heide et al., "Cascaded Displays: Spatiotemporal Superresolution using Offset Pixel Layers," ACM Transactions on Graphics (TOG), vol. 33, No. 4 p. 60:1-60:11 (Jul. 2014).
Okada et al., "Band-limited double-step Fresnel diffraction and its application to computer-generated holograms," Optics Express, vol. 21, No. 7, pp. 9192-9197 (Apr. 8, 2013).
Lanman et al., "Near-Eye Light Field Displays," ACM Transactions on Graphics, vol. 32, No. 6, p. 220:1-220:10 (2013).
Wen et al., "Alternating Direction Methods for Classical and Ptychographic Phase Retrieval," Inverse Problems, vol. 28, No. 11, pp. 1-18 (Oct. 2012).
Bevilacqua et al., "Low-Complexity Single-Image Super-Resolution based on Nonnegative Neighbor Embedding," In Proceedings British Machine Vision Conference, pp. 1-10 (2012).
Candès et al., "PhaseLift: Exact and Stable Signal Recovery from Magnitude Measurements via Convex Programming," Communications on Pure and Applied Mathematics, arXiv:1109.4499v1, pp. 1-31 (Sep. 21, 2011).
Bayraktar et al., "Method to calculate the far field of three-dimensional objects for computer-generated holography," Applied Optics, vol. 49, No. 24, pp. 4647-4654 (Aug. 20, 2010).
Smithwick et al., "Interactive Holographic Stereograms with Accommodation Cues," Proceedings of the Society of Photo-Optical Instrumentation Engineers, vol. 7619, p. 761903:1-761903:13 (Feb. 2010).
Zeyde et al., "On Single Image Scale-up using Sparse-Representations," International Conference on Curves and Surfaces, pp. 1-20 (2010).
Chen et al., "Computer generated hologram from point cloud using graphics processor," Applied Optics, vol. 48, No. 36, pp. 6841-6850 (Dec. 20, 2009).
Matsushima et al., "Extremely high-definition full-parallax computer-generated hologram created by the polygon-based method," Applied Optics, vol. 48, No. 34, pp. H54-H63 (Dec. 1, 2009).
Matsushima et al., "Band-Limited Angular Spectrum Method for Numerical Simulation of Free-Space Propagation in Far and Near Fields," Optics Express, vol. 17, No. 22, p. 19662-19673 (Oct. 26, 2009).
Kim et al., "Mathematical modeling of triangle-mesh-modeled three-dimensional surface objects for digital holography," Applied Optics, vol. 47, No. 19, pp. D117-D127 (Jul. 1, 2008).
Ahrenberg et al., "Computer generated holograms from three dimensional meshes using an analytic light transport model," Applied Optics, vol. 47, No. 10, pp. 1567-1574 (Apr. 1, 2008).
Shen et al., "Fast-Fourier-transform based numerical integration method for the Rayleigh-Sommerfeld diffraction formula," Applied Optics, vol. 45, No. 6, pp. 1102-1110 (Feb. 20, 2006).
Masuda et al., "Computer generated holography using a graphics processing unit," Optics Express, vol. 14, No. 2, pp. 603-608 (Jan. 2006).
Matsushima, "Computer-generated holograms for three-dimensional surface objects with shade and texture," Applied Optics, vol. 44, No. 22, pp. 4607-4614 (Aug. 1, 2005).
Luke, "Relaxed averaged alternating reflections for diffraction imaging," Inverse Problems, vol. 21, No. 1, pp. 37-50 (2005).

(56) References Cited

OTHER PUBLICATIONS

Schmidt, "minFunc: unconstrained differentiable multivariate optimization in Matlab," https://www.cs.ubc.ca/~schmidtm/Software/minFunc.html, pp. 1-6 (2005).
Bauschke et al., "Hybrid Projection-Reflection Method for Phase Retrieval," Journal of the Optical Society of America A (JOSA A), vol. 20, No. 6, pp. 1-28 (2003).
Petz et al., "Fast Hologram Synthesis for 3D Geometry Models using Graphics Hardware," Proceedings of the Society of Photo-Optical Instrumentation Engineers (SPIE), vol. 5005, pp. 266-275 (2003).
Wang et al., "Multi-scale structural similarity for image quality assessment," Proceedings of the 27th IEEE Asilomar Conference on Signals, Systems, and Computers, pp. 1398-1402 (2003).
Martin et al., "A database of human segmented natural images and its application to evaluating segmentation algorithms and measuring ecological statistics," Proceedings of the 8th International Conference on Computer Vision, vol. 2, pp. 416-423 (2001).
Lucente et al., "Rendering Interactive Holographic Images," Proceedings of the 22nd Annual Conference on Computer Graphics and Interactive Techniques, pp. 387-394 (Sep. 1995).
Yamaguchi et al., "Phase-added stereogram: calculation of hologram using computer graphics technique," Proceedings of the Society of Photo-Optical Instrumentation Engineers, vol. 1914, pp. 25-31 (Sep. 17, 1993).
Fienup, "Phase-retrieval algorithms for a complicated optical system," Applied Optics, vol. 32, No. 10, pp. 1737-1746 (Apr. 1, 1993).
Tommasi et al., "Computer-generated holograms of tilted planes by a spatial frequency approach," Journal of the Optical Society of America A, vol. 10, No. 2, pp. 299-305 (Feb. 1993).
Lucente, "Interactive Computation of Holograms Using a Look-up Table," Journal of Electronic Imaging, vol. 2, No. 1, pp. 28-34 (Jan. 1993).
Lane, "Phase Retrieval Using Conjugate Gradient Minimization," Journal of Modern Optics, vol. 38, No. 9, pp. 1797-1813 (1991).
Liu et al., "On the limited memory BFGS method for large scale optimization," Mathematical Programming, vol. 45, No. 1-3, pp. 1-26 (1989).
Leseberg et al., "Computer-generated holograms of 3-D objects composed of tilted planar segments," Applied Optics, vol. 27, No. 14, pp. 3020-3024 (Jul. 15, 1988).
Fienup, "Phase retrieval algorithms: a comparison," Applied Optics, vol. 21, No. 15, pp. 2758-2769 (Aug. 1, 1982).
Bates, "Fourier phase problems are uniquely solvable in mute than one dimension," I: Underlying Theory, Optik, vol. 61, No. 3, pp. 247-262 (1982).
Hsueh et al., "Computer-generated double-phase holograms," Applied Optics, vol. 17, No. 24, pp. 3874-3883 (Dec. 15, 1978).
Gonsalves, "Phase retrieval from modulus data," Journal of the Optical Society of America, vol. 66, No. 9, pp. 961-964 (Sep. 1976).
Gerchberg et al., "A Practical Algorithm for the Determination of Phase from Image and Diffraction Plane Pictures," Optik, vol. 35, No. 2, pp. 237-246 (Nov. 1972).
Lesem et al., "The Kinoform: A New Wavefront Reconstruction Device," IBM Journal of Research and Development, vol. 13, No. 2, pp. 150-155 (Mar. 1969).
Waters, "Holographic image synthesis utilizing theoretical methods," Applied Physics Letters, vol. 9, No. 11, pp. 405-407 (Dec. 1, 1966).
Kim et al., "Perceptual Studies for Foveated Light Field Displays," arXiv:1708.06034v1, 3 pages (Aug. 20, 2017).
Matsushima et al., "Silhouette method for hidden surface removal in computer holography and its acceleration using the switch-back technique," Optics Express, vol. 22, No. 20, p. 24450-24465 (Sep. 2014).
Underkoffler, "Toward Accurate Computation of Optically Reconstructed Holograms," Ph.D. Dissertation, Massachusetts Institute of Technology, pp. 1-165 (Jun. 1991).
Wirtinger, "On the formal theory of the functions of more complex versions," Mathematical Annals, vol. 97, No. 1, pp. 357-375 (1927).
Eybposh et al., "DeepCGH: Fast and Accurate 3D Computer Generated Holography with Deep Learning, supplementary material," http://dx.doi.org/10.1364/optica, pp. 1-3 (Apr. 13, 2020).
Wang et al., "Hardware implementations of computer-generated holography: a review," Opt. Eng., vol. 59, No. 10, pp. 1-31 (2020).
Chakravarthula et al., "Computing high quality phase-only holograms for holographic displays," Proc. SPIE, Optical Architectures for Displays and Sensing in Augmented, Virtual, and Mixed Reality (AR, VR, MR), pp. 1-17 (Feb. 21, 2020).
Chakravarthula et al., "Wirtinger Holography for Near-Eye Displays," ACM Trans. Graph., vol. 38, No. 6, pp. 1-13 (Nov. 2019).
Pozzi et al., "Fast Calculation of Computer Generated Holograms for 3D Photostimulation through Compressive-Sensing Gerchberg-Saxton Algorithm," Methods and Protocols, vol. 2, pp. 1-11 (2019).
Xue et al., "Reliable deep-learning-based phase imaging with uncertainty quantification," Optica, vol. 6, No. 5, pp. 618-629 (May 2019).
Rivenson et al., "Deep learning in holograpy and coherent imaging," Light: Science & Applications, vol. 8, No. 85, pp. 1-8 (2019).
Yang et al., "Holographic imaging and photostimulation of neural activity," Science Direct, pp. 1-20 (2018).
Mardinly et al., "Precise multimodal optical control of neural ensemble activity," Nat Neurosci., vol. 21, No. 6, pp. 1-41 (Jun. 2018).
Rivenson et al., "Phase recovery and holographic image reconstruction using deep learning in neural networks," Light: Science & Applications, vol. 7, pp. 1-9 (2018).
Wu et al., "Extended depth-of-field in holographic imaging using deep-learning-based autofocusing and phase recovery," Optica, vol. 5, No. 6, pp. 704-710 (Jun. 2018).
Horisaki et al., "Deep-learning-generated holography," Applied Optics, pp. 1-6 (Apr. 12, 2018).
Zhang et al., "Closed-loop all-optical manipulation of neural circuits in in vivo," Nat Methods, vol. 15, No. 12, pp. 1-16 (Dec. 1, 2018).
Pégard et al., "Three-dimensional scanless holographic optogenetics with temporal focusing (3D-SHOT)," Nature Communications, vol. 8, No. 1228, pp. 1-14 (2017).
Häussler et al., "Large real-time holographic 3D displays: enabling components and results," Applied Optics, vol. 56, No. 13, pp. F45-F52 (May 1, 2017).
Häussler et al., "Large holographic 3D display for real-time computer-generated holography," Proc. SPIE, pp. 1-12 (Jun. 26, 2017).
Park, "Recent progress in computer-generated holography for three-dimensional scenes," Journal of Information Display, vol. 18, No. 1, pp. 1-13 (2017).
Kingma et al., "ADAM: A Method for Stochastic Optimization," arXiv:1412.6980v9, pp. 1-15 (Jan. 30, 2017).
Eybposh et al., "Segmentation and Classification of Cine-MR Images Using Fully Convolutional Networks and Handcrafted Features," CoRR, abs/1709.02565, pp. 1-9 (2017).
Koller, "Optical trapping: Techniques and applications," in Student Research Celebration, (Montana State University, 2017), pp. 1-1.
Shi et al., "Real-Time Single Image and Video Super-Resolution Using an Efficient Sub-Pixel Convolutional Neural Network," arXiv:1609.05158v2, pp. 1-10 (Sep. 23, 2016).
McHugh, "Head-Tracked Transformations," Humane Virtuality, Head-Tracked Transformations. How do you look behind an object in VR . . . | by Andrew R McHugh | Humane Virtuality | Medium, pp. 1-22 (Aug. 18, 2016).
Abadi et al., "TensorFlow: Large-Scale Machine Learning on Heterogeneous Distributed Systems," arXiv:1603.04467v2, pp. 1-19 (Mar. 16, 2016).
Ioffe et al., "Batch Normalization: Accelerating Deep Network Training by Reducing Internal Covariate Shift," Proceedings of the 32nd International Conference on Machine Learning, pp. 1-9 (2015).
Ronneberger et al., "U-Net: Convolutional Networks for Biomedical Image Segmentation," MICCAI 2015, Part III, LNCS 9351, pp. 1-8 (2015).
Krizhevsky et al., "ImageNet Classification with Deep Convolutional Neural Networks," Advances in Neural Information Processing Systems, pp. 1-9 (2012).

(56) References Cited

OTHER PUBLICATIONS

Neuman et al., "Optical trapping," RevSci Instrum., vol. 75, No. 9, pp. 1-46 (Sep. 2004).
Piestun et al., "Wave fields in three dimensions: analysis and synthesis," J. Opt. Soc. Am. A, vol. 13, No. 9, pp. 1837-1848 (Sep. 1996).
Leseberg, "Computer-generated three-dimensional image holograms," Applied Optics, vol. 31, No. 2, pp. 223-229 (Jan. 10, 1992).
Gerchberg et al., "A Practical Algorithm for the Determination of Phase from Image and Diffraction Plane Pictures," OPTIK, vol. 35, No. 2, pp. 237-246 (1972).

\* cited by examiner

METHODS, SYSTEMS, AND COMPUTER READABLE MEDIA FOR IMPROVED DIGITAL HOLOGRAPHY AND DISPLAY INCORPORATING SAME

RELATED APPLICATIONS

This application claims the benefit of U.S. Provisional Patent Application Ser. No. 62/778,253, filed Dec. 11, 2018; the disclosure of which is incorporated herein by reference in its entirety.

GOVERNMENT INTEREST

This invention was made with government support under Grant Number CNS-1405847 awarded by the National Science Foundation. The government has certain rights in the invention.

TECHNICAL FIELD

The subject matter described herein relates to digital holography with improved resolution and reduced visual artifacts. More particularly, the subject matter described herein relates to methods, systems, and computer readable media for improved digital holography and a display incorporating same.

BACKGROUND

Holography is the process of recording light scattered by an object onto a holographic recording medium, such as a photographic plate. Once the hologram is recorded on the plate, the original image of the scene can be reproduced by illuminating the photographic plate with a light source that corresponds to the location of the reference light source used during the holographic recording process.

In digital holography, the hologram can be computationally generated based on a desired target holographic image and location of the device or devices on which the hologram is recorded. Spatial light modulators (SLMs) are commonly used to record the digitally computed hologram. To generate the desired holographic image, the spatial light modulator is illuminated with a light source.

Existing methods for computing the hologram used in digital holography are computationally intensive and introduce visual artifacts into the resulting images. Accordingly, there exists a need for improved methods and systems for digital holography and a display incorporating improved methods and systems.

SUMMARY

A method for digital holography includes modeling a hologram using a forward propagation model that models propagation of a light filed from a hologram plane to an image plane. The method further includes computing the hologram as a solution to an optimization problem that is based on the model. The method further includes configuring at least one spatial light modulator using the hologram. The method further includes illuminating the spatial light modulator using a light source to create a target image.

According to one aspect of the subject matter described herein, modeling the hologram using a forward propagation model includes modeling the hologram using an angular spectrum, Fourier, Fraunhofer, or Fresnel propagation model.

According to yet another aspect of the subject matter described herein, modeling the hologram using a forward propagation model includes modeling the hologram as a spatially invariant convolution of the hologram and a lens phase function.

According to yet another aspect of the subject matter described herein, the optimization problem uses a least squares optimization function.

According to yet another aspect of the subject matter described herein, the least squares optimization function comprises:

$$\underset{H}{\text{minimize}} \, \||H*L|^2 - I\|_2^2$$

where H is the hologram, L is the lens phase function, and I is the square of the target image intensity.

According to yet another aspect of the subject matter described herein, the hologram comprises a phase hologram for a phase only spatial light modulator and the function $$\underset{H}{\text{minimize}} \, \||H*L|^2 - I\|_2^2$$

is approximated using the function:

$$\underset{\phi}{\text{argmin}} \, \||H*L|^2 - I\|_2^2,$$

where $\phi$ is the phase angle of the hologram for a given object point.

According to yet another aspect of the subject matter described herein, the function $$\underset{\phi}{\text{argmin}} \, \||H*L|^2 - I\|_2^2$$

is approximated using the following function:

$$\underset{\phi}{\text{argmin}} \, \||F^H(FH)(FL)|^2 - I\|_2^2,$$

where F is the Fourier transform operator and $F^H$ is the inverse Fourier transform operator.

According to yet another aspect of the subject matter described herein, computing the hologram includes calculating a gradient of the function $$\underset{\phi}{\text{argmin}} \, \||F^H(FH)(FL)|^2 - I\|_2^2.$$

According to yet another aspect of the subject matter described herein, configuring at least one spatial light modulator includes configuring a single phase only spatial light modulator.

According to yet another aspect of the subject matter described herein, configuring at least one spatial light modulator includes configuring each of a pair of cascaded phase only spatial light modulators.

According to yet another aspect of the subject matter described herein, computing the hologram includes computing an error Err between a reconstructed image $|z|^2$ produced by a hologram H and a target image I for a penalty function $f$ using the following expression:

$$\text{Err} = f(|z|^2, I),$$

where z is the complex wave field at the image plane, is a function of the hologram H, is the output of the propagation model, and is computed using the following expression:

$$z = P(H),$$

where P is the propagation model.

According to yet another aspect of the subject matter described herein, the hologram comprises a phase only hologram and the optimization problem comprises $$\Phi_{opt} = \underset{\Phi}{\text{minimize}} \underbrace{f(|\mathcal{P}(H(\Phi))|^2, I)}_{Err(\Phi)} + \gamma \|\nabla \Phi\|^2,$$

where $\|\nabla \phi\|^2$ is a regularizer on phase patterns of the hologram H, $\gamma$ is a constant, and $\Phi$ is the phase angle of the hologram H.

According to yet another aspect of the subject matter described herein, computing hologram as a solution to the optimization problem comprises approximating a gradient of the penalty function $f$ using Wirtinger derivatives.

According to yet another aspect of the subject matter described herein, the penalty function is based on perceptual accuracy or a learned perceptual similarity metric.

According to yet another aspect of the subject matter described herein, a system for digital holography is provided. The system includes a display device. The display device includes at least one processor. The display device includes a hologram calculator implemented by the at least one processor and configured for modeling a hologram using a forward propagation model that models propagation of a light field from a hologram plane to an image plane and computing the hologram as a solution to an optimization problem that is based on the model. The display device further includes at least one spatial light modulator. The display device further includes a spatial light modulator controller for configuring the at least one spatial light modulator using the hologram. The display device further includes a light source for illuminating the at least one spatial light modulator to create a target image.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter described herein will now be explained with reference to the accompanying drawings of which:

In FIG. 3, image A is a reference image. Image B is a reconstruction of the reference image using a single SLM whose holograph function was generated using the methods described herein. Image C is a reconstruction of the reference image generated using a single SLM whose hologram function is generated using double phase encoding. Image D is a reconstruction of the reference image generated using cascaded SLMs whose hologram function is computed using the methods described herein.

FIG. 8 (bottom) is an image of the prototype holographic near-eye display. In the prototype, we couple lasers of three different wavelengths into a single-mode fiber whose output end can be treated as a point source. The light emitted from the single-mode fiber is polarized and collimated before incident on the phase-only reflective SLM, where the holograms are displayed. The modulated wave is imaged using a camera at the eye position.

DETAILED DESCRIPTION

Figure 1:
FIG. 1 illustrates in the first column, high resolution reference images. The second column illustrates images generating using a single SLM that implements double phase encoding. The third column illustrates simulated images generated using a single SLM whose hologram is computed using the methods described herein. The fourth column illustrates simulated images generated using cascaded low resolution SLMs whose hologram function is computed using the subject matter described herein. The fifth and sixth columns illustrate magnified view of the images in the corresponding colored rectangles in the same row.

This disclosure is organized into three main sections. The first section is entitled Hogel-Free Holography. The second section is entitled Wirtinger Holography. The third section is entitled Supplementary Information for Wirtinger Holography for Near Eye Displays.

Hogel-Free Holography
1 Overview
1.1 Modeling the Hologram

Our forward model for generating the hologram is based on the principle of Fresnel holography. Light propagating from a source is modulated by a spatial light modulator (SLM) device in what is called a hologram plane. When the light encounters the hologram (or SLM) plane, it is diffracted to focus at various encoded object points thus forming a volumetric image. Such phase alterations on the SLM that result in formation of object points by phase modulated light is referred to as lens phase function. A lens phase function can be thought of as a physical lens that is encoded on an SLM. The spatial frequencies encoded in such a holographic lens determine the deflection of the incident light, which higher spatial frequencies deflecting the light more. Since the SLM supports only limited range of frequencies, the lens phase functions corresponding to each point is confined to a local region on the SLM. Mathematically, such a lens phase function representing an object point o can be defined as $$L(\vec{p})_o = e^{j\left(\frac{2\pi\|\vec{p}-\vec{o}\|}{\lambda}\right)}$$

where $\vec{p}$ is the pixel on the local confinement of the lens phase function on the SLM and $\lambda$ is the wavelength of light.

An additive superposition of several such lens phase functions, each representing a unique object point, weighted by their respective image intensities form a complex hologram. This can be represented as mathematically as $$H(\vec{p}) = \Sigma_j A_j L(\vec{p})_j$$

where j runs over set of all object points which have contributions from the pixel p on the SLM, and the intensity of object point at $\vec{j}$ is $A_j^2$.

Note that the hologram is an explicit integration of all object points in the scene. However, this is equivalent to the convolution of the target image with spatially varying complex valued lens phase kernel. If the spatial variance is removed, so that the lens phase function is same for all object points, the calculation of such a hologram can be sped up by replacing the point-wise integration with a spatially invariant convolution:

$$H = A * L$$

where * is the convolution operator, A is the square root of target image intensities and L is the spatially invariant lens phase kernel. Similarly, given a hologram H, the underlying image can be obtained by inverting the process, i.e. deconvolving the Hologram with the lens kernel. It can be observed that the lens phase kernel is a unitary matrix and the deconvolution of hologram can be thought of as convolution with the conjugate lens phase kernel.

Hence the hologram corresponding to a given target image can be thought of as a solution to the following least squares optimization problem.

$$\underset{H}{\text{minimize}} \||H*L|^2 - I\|_2^2$$

Note that $|.|^2$ is an element-wise square, H is the hologram, L is the complex lens phase function and I is the target image. Note that the matrices in the above equation are all vectorized, and hereafter vectorized matrices and normal matrices might be used interchangeably for convenience of representation.

More precisely, since we want to compute the phase hologram for a phase-only SLM, the above optimization is equivalent to $$\underset{\phi}{\text{argmin}} \||H*L|^2 - I\|_2^2$$

where $H = \exp(j\phi)$ is a phase-only hologram with unit amplitude.

Since convolution is equivalent to multiplication in Fourier domain, $$\underset{\phi}{\text{argmin}} \||F^H(FH)(FL)|^2 - I\|_2^2$$

where F is a Fourier transform operator and $F^H$ is the hermitian of it resulting in inverse Fourier transform.

Define $z = F^H(FH)(FL)$ and $f(z) = \||z|^2 - I\|_2^2$, then the loss function $E(H) = \||F^H(FH)(FL)|^2 - I\|_2^2$ is equivalent to $$E(H) = f(z)$$

$$\begin{aligned} d(E(H)) &= df(z) \\ &= \text{Re}\langle \nabla f, dz \rangle \\ &= \text{Re}\langle \nabla f, d(F^H(FH)(FL)) \rangle \\ &= \text{Re}\langle \nabla f, F^H FLF dH \rangle \\ &= \text{Re}\langle F^H(FL)^H F \nabla f, dH \rangle \\ &= \text{Re}\langle F^H(FL)^* F \nabla f, dH \rangle \\ &= \text{Re}\langle F^H(FL)^* F \nabla f, d(e^{j\phi}) \rangle \\ &= \text{Re}\langle je^{j\phi} F^H(FL)^* F \nabla f, d(\phi) \rangle \end{aligned}$$

Note that L is a unitary and symmetric matrix in our case, and so is FL. And hence the hermitian is equal to the complex conjugate.

From the definition of $f(z)$, we can obtain the gradient of $f$ as $$\begin{aligned} \nabla f &= 2\nabla_z f \\ &= 2\nabla_z(\||z|^2 - I\|) \\ &= 2(|z|^2 - I) \circ \nabla_z(|z|^2) \\ &= 2(|z|^2 - I) \circ \nabla_z(z\bar{z}) \\ &= 2(|z|^2 - I) \circ z \end{aligned}$$

where the operator ∘ denotes the Hadamard product or element-wise product.

With the above objective function and the gradient, the nonconvex problem can be solved with quasi-newton method or interior-point method with L-BFGS updates for images of large sizes.

For the cascaded SLM version, the complete hologram is contributed by both SLMs in a multiplicative fashion for the field, or additive in phase. Therefore the hologram H can be defined as $$H = H_1 \circ H_2$$

where $H1 = \exp(j\phi_1)$ and $H2 = \exp(j\phi_2)$ are solved for in an alternating least squares sense.

2 Evaluation and Analysis

NOTE: Double phase encoding with object phase compensation as employed by [Maimone et al. 2017] is referred to as just double phase encoding here for simplicity.

In this section we quantitatively and qualitatively analyze our algorithm for generating holograms, both for a single phase-only SLM and two cascaded SLMs for super resolution, both in simulation and by experiment.

2.1 Software Simulation

We evaluate the theoretical performance and achieved quality of the holograms generated by our method, in simulation, by numerically reconstructing the holographic image. For this, holograms for various images are generated for an SLM of resolution 1920×1080 pixels, with a lens phase kernel of size 176 pixels along each dimension. All full color holograms are generated in a color sequential manner, simulating the physical prototype.

The numerical reconstruction was done as an inverse process of our hologram generation forward model, i.e. by deconvolving the hologram with the lens phase function. We also simulate the superresolved holographic images generated by cascading two SLMs each of half the resolution, i.e. 960×540 pixels. All the input images used for computing the holograms as well as the holographic output are maintained to be equal to 1920×1080 in resolution. Note that our hologram generation forward model is partially similar to that of double phase encoding hologram (DPH) which produced noise-free and high-quality reconstructions [Maimone et al. 2017]. Therefore, for each example, we compare our approach with DPH by keeping the settings of hologram generation process identical in both cases.

2.1.1 Quantitative Analysis.

Figure 2:
FIG. 2 is a table comparing the peak signal to noise ratio (PSNR) measurements of holographic images produced using holograms computed by the methods described herein and holograms from the double phase encoding method.

FIG. 1 compares image patches reconstructed from holograms computed by our method, against those computed by double phase encoding algorithm. The table illustrated in FIG. 2 provides quantitative comparisons of the images using PSNR measurements. The intensity of the reconstructed image is adjusted to have the same mean value of the corresponding original image for analyzing the holographic image quality of images produced by all methods [Yoshikawa et al. 2016].

Several observations can be made from visual comparisons and the quality metric table. Foremost, we find that our method outperforms double phase encoding holograms for a single SLM by a significant margin. Moreover, for superresolved images from cascaded low resolution SLMs, our method outperform double phase encoding, resulting in superior quality reconstructed images, and closely approach holographic images generated by our method from a single high-resolution phase SLM. We emphasize that the cascaded SLM implementation spatially superresolved images by a factor of four, i.e. twice as many pixels along each axis. Apart from these metrics which provide a global evaluation of the image quality, we also provide magnified views in FIG. 1 which we find to give more visually meaningful information to the high error region.

The advantages gained in the PSNR values directly translate to visible reductions in artifacts: a detailed qualitative analysis is done in the next section. These measurements highlight the performance of our algorithm and the promise of using cascaded SLMs for producing superior quality holographic images of quadrupled resolution, a capability that has not been achieved before to the best of our knowledge.

2.1.2 Qualitative Analysis

We notice three major artifacts that substantially degrade the quality of holographic images produced by double phase encoding method: 1) resolution loss due to direct amplitude encoding, 2) ringing artifacts and 3) color artifacts. In this section, we qualitatively analyze the performance our algorithm. FIG. 1 compares image patches produced by our method, both for a single SLM and a cascade of two low resolution SLMs, against double phase holograms.

Resolution

Although the double phase encoding method adopted by Maimone et al. [2017] produce a close approximation to the target image, encoding a single complex value into two phase values result in loss of resolution of holographic images. It can be observed that our method produces high quality reconstructed images without any effective loss of resolution. Moreover, our cascaded hologram implementation successfully produced images effectively of resolution four times the resolution of any single SLM. For example, notice the enhancement of text, in FIG. 1, and the scales on the ruler.

Ringing

The ringing effect, or Gibbs phenomenon, is a rippling artifact near sharp edges caused by either distortion or loss of high frequency information. Although ringing artifacts arising from double phase encoding are subtle for smooth images, they are very prominent for images with many high frequency details. Images in the last two rows in FIG. 1 shows an example of reconstruction of a newspaper and a ruler. It can be observed how the ringing artifacts degrade the reconstructed image quality in double phase hologram. Our method produces holograms with no such ringing artifacts. The cascaded hologram computed by our method also produces faithful reconstruction of the target images, sometimes with subtle noise, which is not visible unless zoomed sufficiently.

Color Artifacts

Figure 3:
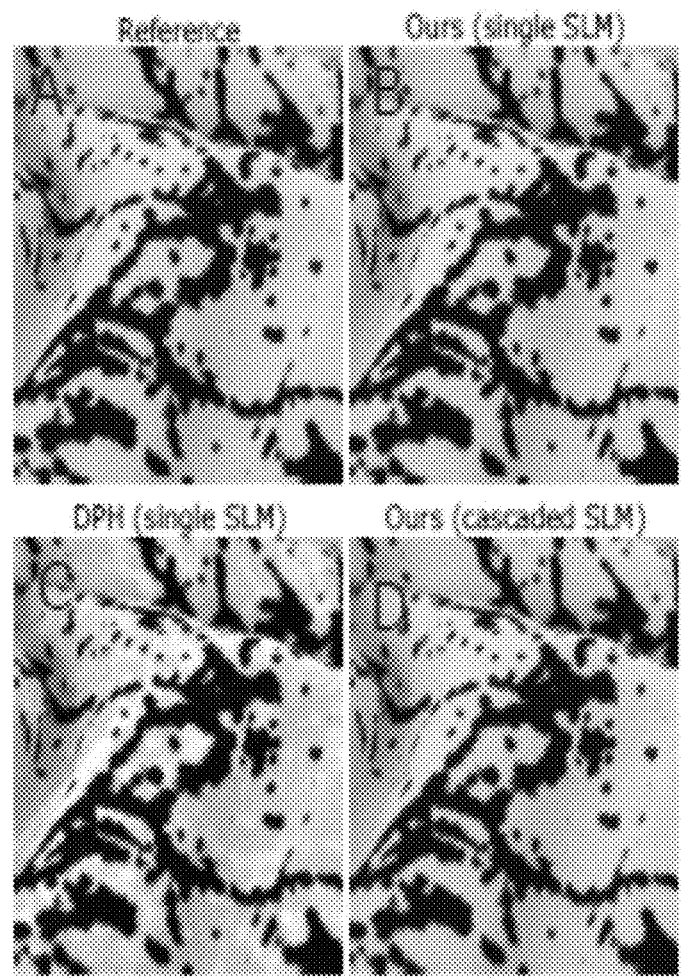
FIG. 3 illustrates color artifacts generated using different hologram computation methods.

We observed that sometimes the reconstructed holographic image from a double phase hologram produce color artifacts, mainly on patches of white or gray. Our method produced accurate numerical reconstructions for both single SLM hologram as well as cascaded hologram. FIG. 3 shows a scenario where our method performs significantly better than double phase encoding method. The undesired green colorations can be observed on the holographic image produced by a double phase hologram whereas our method produced accurate reconstructions, both for single and cascaded SLMs.

Figure 4:
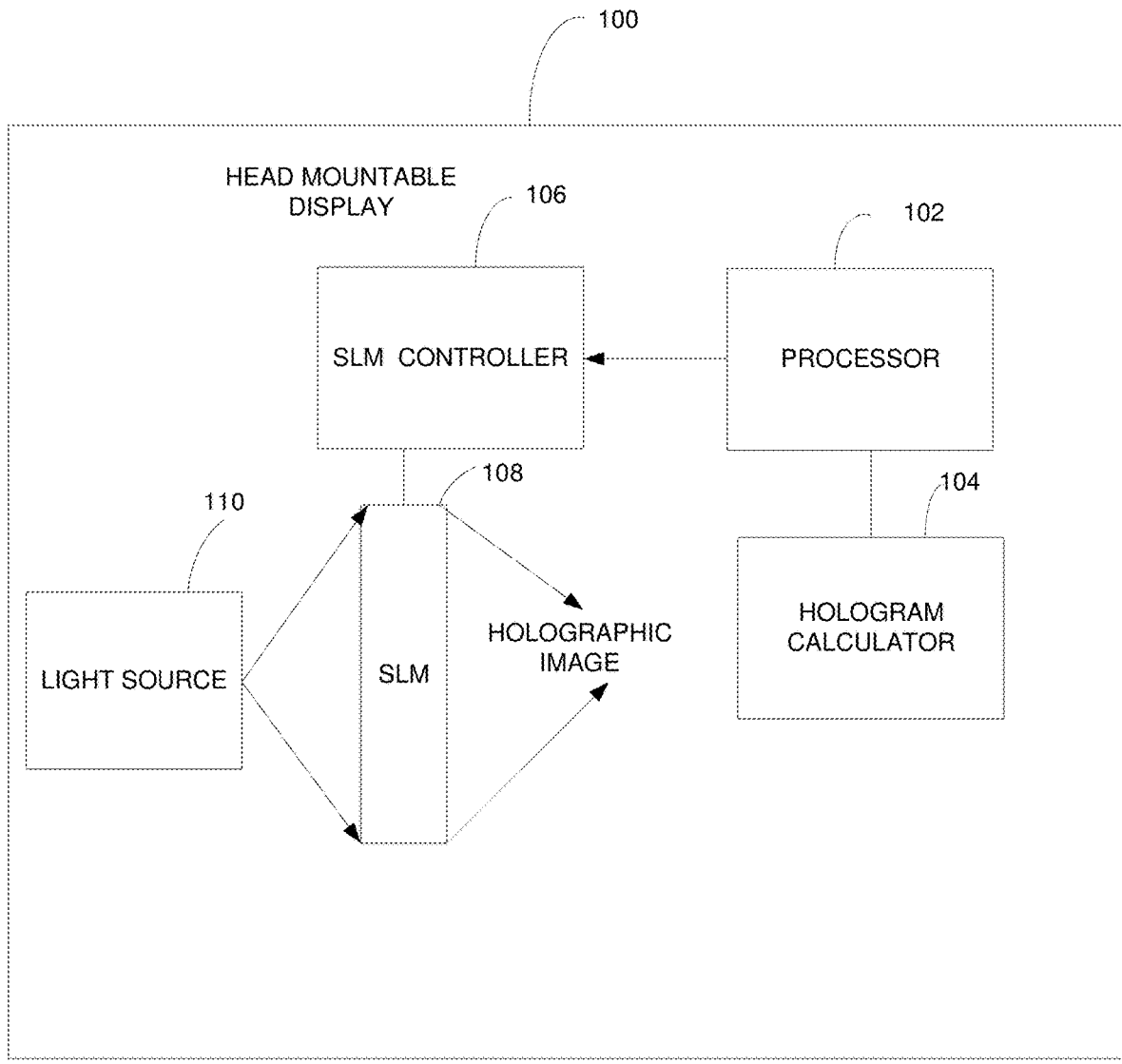
FIG. 4 is a block diagram of a head-mountable display using an SLM having a hologram computed using the methodology described herein.

FIG. 4 is a block diagram of a head-mountable display that incorporates a spatial light modulator that implements the holograms computed using the methodology described herein. The display illustrated in FIG. 4 may implement Hogel-free holography as described in this section or Wirtinger holography as described in the sections below. Referring to FIG. 4, a head-mountable display 100 includes a form factor that is designed to be worn on a user's head. For example, head-mountable display 100 may include a frame that has a form factor designed to be worn on a user's head. For example, the frame may have an eyeglasses or helmet-like form factor where a display screen is placed in front of a user's eyes. Head-mountable display 100 may be an AR display where the user views synthetic images and real-world images. Alternatively, head-mountable display may be a VR display where the user views only synthetic images.

In the illustrated example, head-mountable display 100 includes a processor 102 that implements a hologram calculation function 104. Processor 102 may be any suitable processor, such as a graphics processing unit. Hologram calculation function 104 calculates holograms using the methodology described herein to generate target holographic images. Under control of hologram calculation function 104, processor 102 instructs a spatial light modulator controller 106 to configure a spatial light modulator 108 to generate the computed hologram functions. Spatial light modulator 108 may be a configurable device capable of implementing diffraction patterns corresponding to the calculated hologram functions. As stated above, spatial light modulators may be cascaded to implement a hologram. A light source 110 illuminates spatial light modulator 108 to generate desired or target holographic images.

Although FIG. 4 illustrates a head mountable display, such as a near-eye display, as an example application for digitally encoded holograms computed using the methodology described herein. The holograms computing using the methodology described herein can be used in any type of display, including heads-up displays for aircraft or automobiles.

Figure 5:
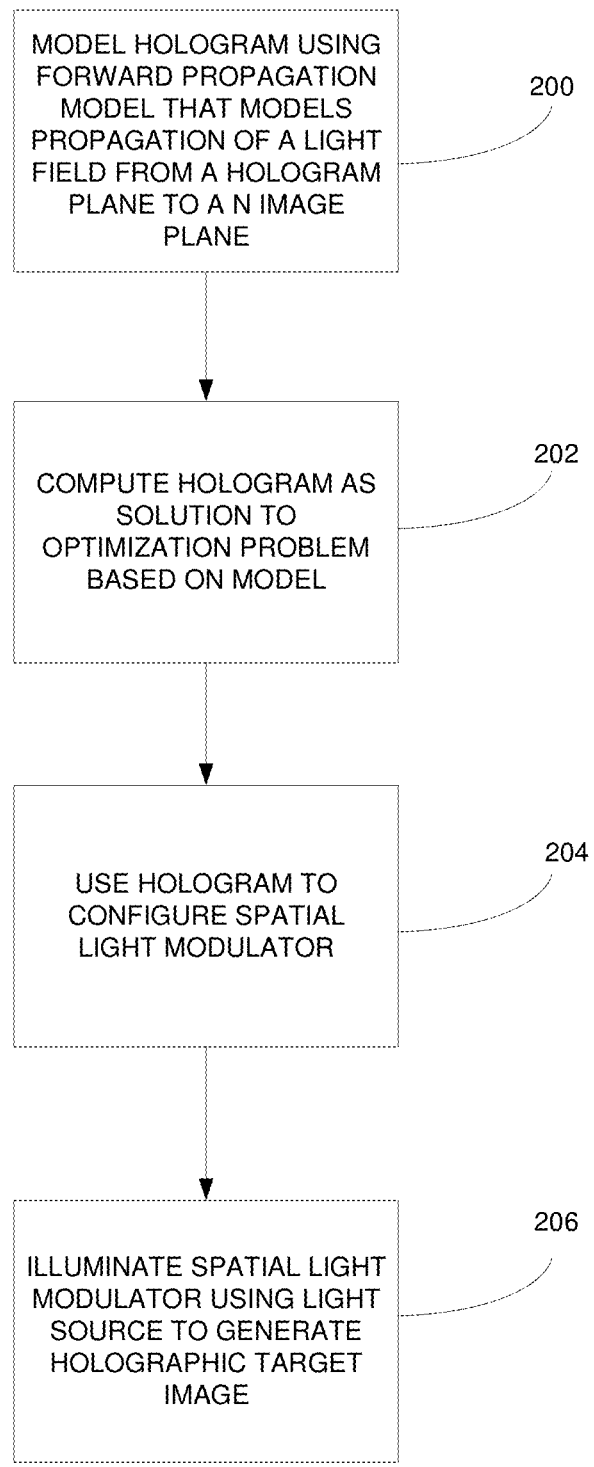
FIG. 5 is a flow chart illustrating a method for improved digital holography.

FIG. 5 is a flow chart illustrating an exemplary process for digital holography using the subject matter described herein. Digital holography is intended to include Hogel-free holography as defined in this section or Wirtinger holography, as described in the sections below. Referring to FIG. 5, in step 200, a hologram is modeled using a forward propagation model that models propagation of a light field from a hologram plane to an image plane . For example, the propagation model may be a convolution, angular spectrum, Fourier, Fraunhofer, Fresnel, or any other suitable forward propagation model.

In step 202, the hologram is computed as a solution to an optimization problem that is based on the model. In one example, the optimization problem uses the least squares optimization function described above that minimizes an error between the square of the convolution of the hologram and the lens phase function and the square of target image intensities. In step 204, the hologram is used to configure at least one spatial light modulator. Configuring the spatial light modulator may include adjusting the pixels of a display, such as an LCD, to implement the phases specified in the hologram function. In step 206, the spatial light modulator is illuminated with a light source to generate the target image. Thus, the light source and the spatial light modulator may together be a holographic projector included in the head-mountable display.

Wirtinger Holography for Near-Eye Displays

Near-eye displays using holographic projection are emerging as an exciting display approach for virtual and augmented reality at high-resolution without complex optical setups-shifting optical complexity to computation. While precise phase modulation hardware is becoming available, phase retrieval algorithms are still in their infancy, and holographic display approaches resort to heuristic encoding methods or iterative methods relying on various relaxations.

Figure 6:
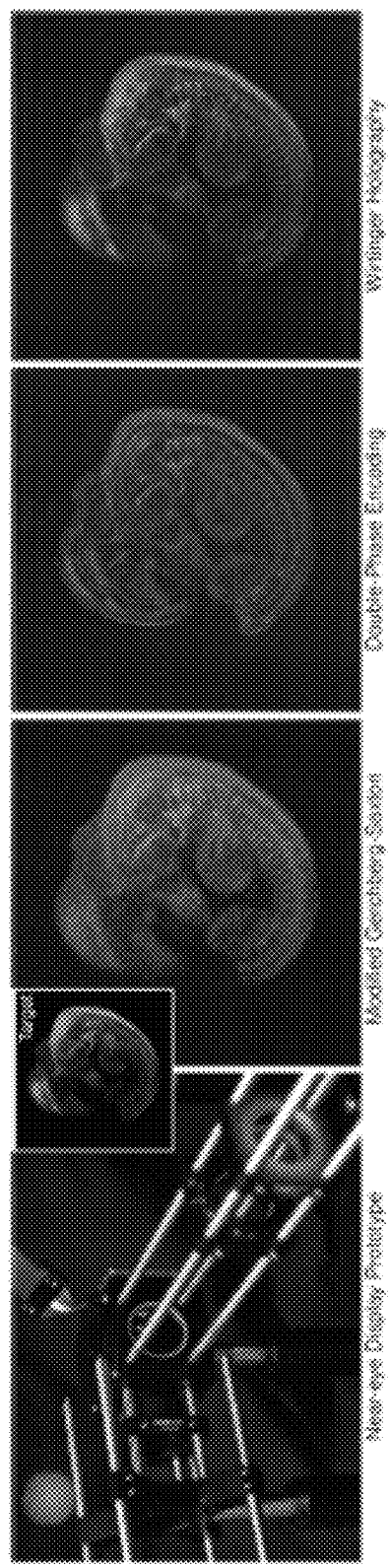
FIG. 6 illustrates Wirtinger holography on a display prototype. To compute phase-only modulation patterns, we depart from existing iterative projection algorithms, such as error-reduction Gerchberg-Saxton methods [Gerchberg 1972; Peng et al. 2017], and heuristic encoding approximations, such as the double phase encoding method [Hsueh and Sawchuk 1978]. Instead, we revisit the use of formal optimization using complex Wirtinger derivatives for the underlying phase retrieval problem. We built a near-eye display prototype using a phase-only spatial light modulator (SLM) and off-the-shelf optics (left). Compared to holographic reconstructions at a set focal distance from the existing methods [Peng et al. 2017] (center left) and [Maimone et al. 2017] (center right), the proposed Wirtinger holography substantially reduces reconstruction artifacts on our prototype, while achieving an order of magnitude reduced error in simulation. The rightmost three images of holographic encodings of a mouse embryo image by Miltenyi Biotec.

In this work, we depart from such existing approximations and solve the phase retrieval problem for a hologram of a scene at a single depth at a given time by revisiting complex Wirtinger derivatives, also extending our framework to render 3D volumetric scenes. Using Wirtinger derivatives allows us to pose the phase retrieval problem as a quadratic problem which can be minimized with first-order optimization methods. The proposed Wirtinger Holography is flexible and facilitates the use of different loss functions, including learned perceptual losses parametrized by deep neural networks, as well as stochastic optimization methods. We validate this framework by demonstrating holographic reconstructions with an order of magnitude lower error, both in simulation and on an experimental hardware prototype. FIG. 6 is an image of the experimental prototype along with a comparison of images generated using Wirtinger holography, modified Gerchberg-Saxton holography, and double-phase encoding holography.

1 Introduction

Over the last few years, near-eye display approaches have been emerging at a rapid pace, ultimately promising practical and comfortable virtual reality (VR) and augmented reality (AR) in the future. Head-mounted displays for stationary virtual reality use-cases have become ubiquitous consumer products, having solved resolution, field of view (FOV), tracking and latency limitations of the past decades of research. Today's AR devices partially inherit these advances but are still limited to large form factors and are unable to allow for occlusions and continuous focus cues needed to avoid the vergence-accommodation conflict. Approaches using conventional optics to address these individual problems are often restricted to large setups, possibly involving actuation [Chakravarthula et al. 2018]. Near-eye displays using light field modulation [Huang et al. 2015a; Lanman and Luebke 2013] offer an alternative approach with impressive results but only provide sparse ray-space sampling at acceptable spatial resolutions—the spatio-angular resolution trade-off is fundamentally limited by diffraction.

In theory, digital holography offers an elegant way to solve the complex optical design challenges for near-eye displays. Instead of physically controlling the emitted wavefront of light with cascades of (variable) refractive optics and conventional displays, holographic displays shift this process to computation. Given a scene intensity image and associated depth map, holographic display methods solve for the states of a phase (and amplitude) modulator to encode the corresponding phase in an incident source wavefront. Assuming for a moment that the encoding process is perfect, this approach allows for high-resolution and continuous focus cues. Building on precise phase modulation hardware and a large body of existing work in holography, the recent seminal works of Maimone et al. [2017] and Shi et al. [2017] demonstrate impressive high-FOV holographic near-eye displays in a light-weight wearable form-factor. Although these approaches offer insight into the promise of holographic near-eye displays, they rely on heuristic holographic phase encoding schemes that severely restrict the achievable image quality and future re-search. Akin to early image processing methods, it is challenging to solve for different loss functions, or research additional modulation schemes or hybrid systems.

In this work, we deviate from heuristic solutions to holographic phase retrieval. Instead, we rely on formal optimization enabled by complex Wirtinger derivatives. With a differentiable forward model and its (Wirtinger) gradient in hand, we formulate a quadratic loss function that is solved via a first-order optimization method. Specifically, we demonstrate that the problem is not required to be relaxed, as in recent lifting methods [Candes et al. 2015] but can be directly solved with standard methods. We show that the phase retrieval problem for digital Fresnel holography can be solved efficiently using a quasi-Newton method or stochastic gradient descent. We achieve an order of magnitude lower reconstruction error, i.e., 10 dB peak signal to noise ratio (PSNR) improvement. We validate the proposed method in simulation and using an experimental prototype, demonstrating that this improvement eliminates severe artefacts present in existing methods. We validate the flexibility of the proposed phase retrieval method by modifying the objective with a learned perceptual loss, which can be optimized using vanilla stochastic gradient descent (SGD) methods. Moreover, we show, in simulation, that the proposed framework allows to incorporate additional optics or modulation in a plug-and-play fashion.

Specifically, we make the following contributions in this work:

- We introduce complex Wirtinger derivatives for holographic display formation, that allow us to directly solve holographic phase retrieval problems as formal optimization problems using first-order optimization algorithms.
- We validate the proposed differentiable framework by solving phase retrieval of holographic projections with constant focus over the image as a least-squares problem using off-the-shelf quasi-Newton optimization. The resulting holographic reconstructions have an order of magnitude lower error than previous methods.
- We demonstrate the flexibility of the Wirtinger framework by solving for a perceptual loss function parameterized by a convolutional deep neural network. Moreover, in simulation, we show that the method facilitates alternative optical setups such as cascaded modulation on two sequential phase SLMs.
- We assess the proposed framework experimentally with a prototype near-eye holographic display setup. The proposed method reduces severe artifacts of existing holographic imaging approaches.

Limitations. Although the proposed approach provides unprecedented holographic phase retrieval quality, while being flexible as a formal optimization framework, we do not achieve real-time frame rates on consumer hardware. The runtime is comparable to that of the modified Gerchberg-Saxton method from [Peng et al. 2017], at about 30 sec for a full HD hologram on a consumer laptop computer with partial GPU acceleration. However, akin to ray tracing, which recently has been enabled at real-time rates using dedicated hardware, we hope that a low-level implementation on next-generation GPU hardware, or dedicated hardware, could overcome this limitation in the future. In the meantime, it is practical to use a computationally cheap initial iterate combined with Wirtinger refinement. We anticipate the extension of Wirtinger holography to 3D holograms, defined as holograms which simultaneously address points at different depths. In addition, it is possible to extend the technique described herein to render high-quality 3D volumetric scenes by dynamically adjusting the focal distance to the foveal region of interest, as demonstrated earlier by [Maimone et al. 2017].

2 Related Work

Computational holograms are traditionally classified into Fourier holograms corresponding to far-field Fraunhofer diffraction, and Fresnel holograms which produce images in the near field, as determined by the Fresnel Number. The computational complexity between near-field and far-field holograms is substantial. While computing far-field holograms using 2D Fourier transforms can be accomplished using fast algorithms and optimized hardware, computing near-field Fresnel holograms admits no simple analytic solution. In fact, it is mathematically equivalent to inverting a generalized scalar diffraction integral [Underkoffler 1991]. A majority of work on this topic investigates numerical techniques for generating Fresnel fringe patterns. In this section, we briefly summarize prior work related to hologram computation and display.

2.1 Traditional Phase Retrieval Algorithms

A Fourier hologram produces a flat image at a far distance Fourier plane, and such a hologram is often computed using traditional phase retrieval techniques. Phase retrieval is the method of recovering an unknown signal from the measured magnitude of its Fourier transform. Since the phase is lost in the measurement of the signal, the inverse problem of recovering it is generally ill-posed. However, the phase can be perfectly recovered, in theory, by solving a set of non-linear equations if the measurements are sufficiently over-sampled [Bates 1982]. Early methods of phase retrieval included error reduction methods using iterative optimization [Gerchberg 1972; Lesem et al. 1969], together with an assumption on a non-zero support of the real-valued signal, with applications in optics, crystallography, biology and physics. Extension of such iterative algorithm is the popular hybrid input-output (HIO) method [Fienup 1982], and others with various relaxations [Bauschke et al. 2003; Luke 2004]. Phase-retrieval methods using first-order non-linear optimization have been explored in the past to characterize complex optical systems [Fienup 1993; Gonsalves 1976; Lane 1991], eventually also sparking recent work on using alternative direction methods for phase retrieval [Marchesini et al. 2016; Wen et al. 2012], non-convex optimization [Zhang et al. 2017], and methods overcoming the non-convex nature of the phase retrieval problem by lifting, i.e. relaxation, to a semidefinite [Candes et al. 2013] or linear program [Bahmani and Romberg 2017; Goldstein and Studer 2018].

2.2 Computational Fresnel holograms

Fresnel hologram computation can be categorized into two classes. 1) Geometry-based techniques, which model three-dimensional scene geometry as a collection of emitters; either point-emitters (point-source method) or polygonal tiles (polygon-based method). The collective interference of these emitters with a reference wave is computed at a set of discretized locations throughout the combined field to generate a hologram of the scene [Benton and Bove Jr 2008]. 2) Image-based techniques, which leverage the advantage of computer graphics rendering techniques along with wave propagation. Next, we review geometry and image-based methods.

Point-source methods. Waters et al. [1966] were the first to propose using a collection of points rather than finite sized objects to model a scene for holographic image generation. By using a look-up table of precomputed elemental fringes, Lucente et al. [1993] sped up the point-source hologram computation to under one second. Recent point-source based computer generated holography (CGH) computation methods leverage the parallelization of a computer graphics card [Chen and Wilkinson 2009; Masuda et al. 2006; Petz and Magnor 2003]. Most recent work of Maimone et al. [2017] presents a point-source based CGH computation for holographic near-eye displays for both virtual and augmented reality. All of these methods have in common that the optical transmission process of different primitives is modeled to be independent, and hence, it is challenging to accurately represent view-dependent mutual-occlusion and shading. Moreover, a continuous parallax demands a very dense set of point-sources which requires a large compute budget.

Polygonal methods. Polygonal methods for computing CGH also have existed for decades [Leseberg and Frère 1988]. The basic idea of this approach to CGH is to represent a 3D object as a collection of tilted and shifted planes. The diffraction patterns from a tilted input plane can be computed by the fast Fourier transform (FFT) algorithm and an additional coordinate transformation. This analysis can also be done in the spatial frequency domain by using the translation and rotation transformations of the angular spectra permitting the use of FFT algorithms [Tommasi and Bianco 1993]. Moreover, a property function can be defined for each planar input surface to provide texture [Matsushima 2005] and shading [Ahrenberg et al. 2008; Matsushima 2005]. Researchers also have explored geometric facet selection methods by ray tracing [Kim et al. 2008], silhouette methods [Matsushima and Nakahara 2009; Matsushima et al. 2014] and inverse orthographic projection techniques [Jia et al. 2014] to provide occlusion culling effects.

Image-based methods. Image-based holography techniques can be broadly categorized into light field and layer-based methods. Light field holograms, also known as holographic stereograms, partition a hologram spatially into elementary hologram patches, each producing local ray distributions (images) that together reconstruct multiple views supporting intra-ocular occlusions [Lucente and Galyean 1995; Smithwick et al. 2010; Yamaguchi et al. 1993]. Holo-graphic stereograms can be paired with the point-source method to enhance the image fidelity to provide accommodation and occlusion cues [Shi et al. 2017; Zhang et al. 2015]. Layer-based methods, in contrast, compute the hologram by slicing objects at multiple depths and superimposing the wavefronts from each slice on the hologram plane [Bayraktar and Özcan 2010; Zhao et al. 2015]. Layer-based and light field methods can both be combined to produce view-dependent occlusion effects [Chen and Chu 2015; Zhang et al. 2016]. While prior work on holographic phase retrieval addressed computing holograms for both 2D and 3D scenes, the focus of the subject matter described herein lies on rendering high-quality images of scenes at a single depth plane. The method can be extended to volumetric scenes as discussed in Section 6.2.

3 Computational Display Holography

Computational display holography (CDH) simulates the physical processes of an optical hologram recording and reconstruction, using numerical methods. The computed holographic image is brought to life by a holographic display, typically consisting of an illuminating source and a phase-modifying (sometimes also amplitude-modifying) spatial light modulator (SLM). The phase of the SLM describes the delay of the incident wave phase introduced by the SLM element. Note that the geometrical (ray) optics model, commonly used in computer graphics, models light as rays of photon travel instead of waves. Although being an approximation to physical optics, i.e. ignoring diffraction, ray optics still can provide an intuition: the perpendiculars to the waves can be thought of as rays, and, vice versa, phase intuitively describes the relative delay of photons traveling along these rays. We refer the reader to [Goodman 2005] for a detailed review.

In the following, we review Fresnel holography, which can pro-duce near-field imagery for near-eye display applications. Specifically, we review propagation for scenes modeled as point source emitters and a convolutional forward model, which both provide intuition for the image formation process. The proposed method is not limited to either of these propagation models but, indeed, flexible to support a variety of different propagation models, including Fourier-based propagation, Fresnel, Fraunhofer, and angular spectrum propagation, all of which we review in the supplemental material.

3.1 Point-source Propagation

Figure 7:
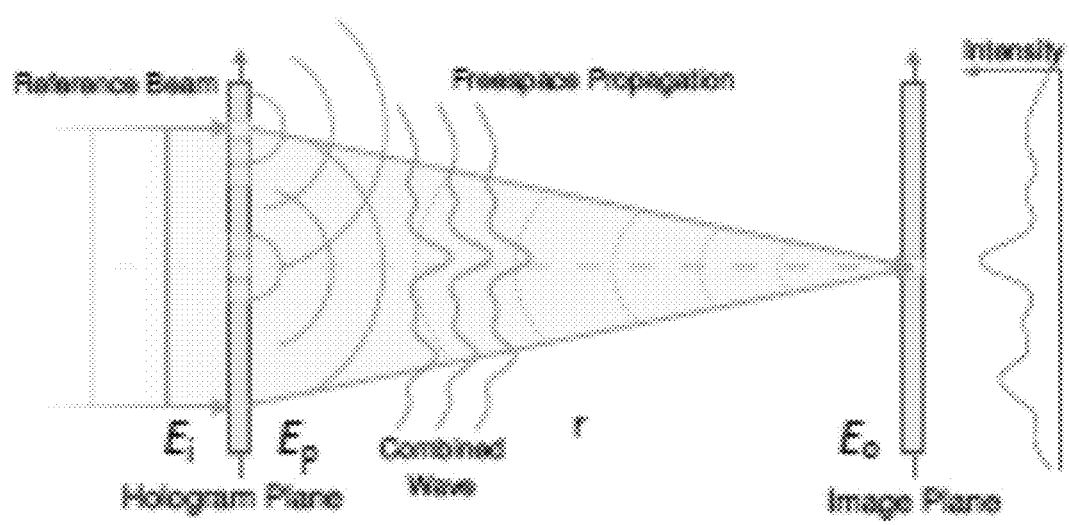
FIG. 7 is a schematic diagram of a scalar diffraction model, in which the incident wave (Ei) first gets modulated by the phase delays on the hologram, where each pixel then emits a sub-wave (Ep) that propagates in free space to the image plane. The complex amplitude of one point on the image plane (EO) is the integration of sub-waves propagated from all pixels on the hologram plane. Note, r here represents the Euclidean distance. As such, given a target propagated distance and a principle wavelength, a sharp point spread function on the image plane can be obtained under the point-source propagation model, corresponding to the phase distribution of a lens on the hologram plane.

Computing a hologram requires knowledge of both the illuminating reference wave and the object wave. Given a 3D model of the scene, the object wave can be modeled as a superposition of waves from spherical point emitters at the location of object points and propagating towards the hologram plane where the SLM is located, see FIG. 7. The object wave $E_o$ reaching a pixel at location $\vec{p}$ on the SLM at the hologram plane, from a point source located at an object point at $\vec{o}$, can be expressed as $$E_O(\vec{p}) = a_o \exp^{j\left(\phi_o + \frac{2\pi r(\vec{p},\vec{o})}{\lambda}\right)}, \quad (1)$$

where $\lambda$ is the illumination reference wavelength, $a_o$ is the amplitude of wave at the object point $\vec{o}$, $\phi_0$ is the (initial) phase associated with each diffuse object point and $r(\vec{p},\vec{o})$ is the Euclidean distance between the object point and the SLM pixel.

Equation 1 describes the phase patterns corresponding to each object point on the hologram plane. Under a paraxial approximation these phase patterns act as Fresnel lenses, also see supplemental material. Owing to the optical path difference, the spatial frequencies of these phase patterns increase from the center towards the edges, where the light is deflected maximally. However, the maximum deflection angle supported by an SLM is limited, hence restricting the lens phase patterns to a smaller region. Therefore, the overall hologram can be thought of as a superposition of local lens phase patterns, or phase Fresnel lenses, corresponding to individual target object points $$H(\vec{p}) = \sum_{o \in s_p} a_o \exp^{j\left(\phi_o + \frac{2\pi r(\vec{p},\vec{o})}{\lambda}\right)} = \sum_{o \in s_p} a_o L_o(\vec{p}), \quad (2)$$

Where $s_p$ is the set of object points whose phase Fresnel lenses are defined at a pixel $\vec{p}$, and L is the lens phase function of the phase Fresnel lens for a given object point.

3.2 Convolutional Propagation

The point-wise integration described in the previous paragraphs requires intensive computation when all object points of a full three-dimensional scene are considered. If we make the assumption that the scene is located on a single depth plane, this integration is equivalent to the convolution of the target image with a complex valued lens phase function L [Maimone et al. 2017]

$$H = A * L, \quad (3)$$

where * is the complex-valued convolution operator, A represents the complex amplitude of the underlying image, and L is a spatially invariant lens phase function which is the same for all object points $\vec{o}$. Although the focus, i.e., depth, over the image is constant, the focus may be changed globally either on a per-frame basis or in a gaze-contingent manner by employing eye tracking [Maimone et al. 2017].

For a given hologram H from Equation 3, an approximate holographic image on the image plane, after propagating the modulated wave field, can be formulated as a convolution of the hologram with the complex conjugate of the lens function $$I = |H * \bar{L}|^2 = |\mathcal{F}^{-1}(\mathcal{F}[H] \circ \mathcal{F}[\bar{L}])|^2, \quad (4)$$

where $|.|^2$ denotes the element-wise absolute value squared operation, $\bar{L}$ is the conjugate lens phase function, $\mathcal{F}$ the Fourier transform operator, $\circ$ is the Hadamard element-wise multiplication and I is the intensity of the image.

4 Wirtinger Holography

In this section, we present a framework for computing high-quality phase-only holograms for near-eye display applications. We start by formulating phase hologram computation as a general optimization problem independently of the propagation model, and only assuming that this forward model is differentiable. Once cast as an optimization problem, we show how first-order optimization techniques can be applied to solve this complex non-convex problem.

For the sake of brevity, the penalty functions and corresponding gradients in this section are defined for matrices in vectorized form. For the ease of notation, we use matrices and their vectorized versions interchangeably. Note that, in practice, we do not explicitly form million-dimensional vectors for optimizing holograms, but instead perform all operations on tensors for efficient memory usage and computation.

4.1 Synthesizing Optimal Phase Holograms

Section 3 discussed the computation of Fresnel holograms, and the reconstruction of holographic images by propagating the field from the hologram plane to the image plane using different propagation models. If z is the complex wave field at the image plane, the error between the reconstructed image $|z|^2$ produced by the hologram H and the target image I can be computed as $$Err = f(|z|^2, I) = f(z),\qquad(5)$$

for a general penalty function $f$. Note that the field z is a function of the hologram H, and is the output of the propagation function P, as discussed in Section 3, that is $$z = P(H)\qquad(6)$$

The phase-only hologram H has a constant amplitude across the hologram plane with each of its entries of the form $$H(\Phi) = c e^{j\Phi} = c(h_i) = c e^{j\phi_i},\qquad(7)$$

where c is the (constant) amplitude, and $\phi_i$ is the phase associated with the i-th pixel on the SLM located at the hologram plane. Without loss of generality, the value of c may be set to unity for all practical purposes. We are interested in computing the phase-only hologram to display on a phase modulating SLM which can be formulated as solution to the following non-convex error minimization problem $$\Phi_{opt} = \underset{\Phi}{\text{minimize}}\ \underbrace{f(|\mathcal{P}(H(\Phi))|^2, I)}_{Err(\Phi)} + \gamma \|\nabla \Phi\|^2.\qquad(8)$$

where $\|\nabla \phi\|^2$ is an optional regularizer on the phase patterns, which may, for example, enforce constraints on the phase variations to account for SLM limitations, e.g., limited modulation range of frequency. We show that this non-convex holographic phase retrieval problem can be solved using first-order optimization algorithms. In the following section, we discuss calculating the Wirtinger gradient for the objective function before describing how we apply first-order optimization methods.

4.2 Computing the Complex Gradient

Chain rule. The gradient of the objective from Equation 8 can be calculated from Equations 5, 6 and 7, using chain rule as follows $$\frac{d(Err)}{d\Phi} = \underbrace{\frac{df}{dz}}_{I}\ \underbrace{\frac{dz}{dH}}_{II}\ \underbrace{\frac{dH}{d\Phi}}_{III}.\qquad(9)$$

Non-Holomorphic Objective. We assume that our objective is a real-valued non-convex function of complex variables, that is $f: \mathbb{C}^n \mapsto \mathbb{R}$, where n is the number of elements in z (equal to that in H). A complex function that is complex differentiable at everypoint in its domain is called a holomorphic function. However, a real-valued function of a complex argument cannot be holomorphic unless it is a constant—its derivative is not defined in its domain. The derivative of such a holomorphic real-valued function is always zero, refer to supplemental material. Since our objective function is not a constant, the derivatives of any order are not defined in its domain. We note that [Fienup 1993] arrived at a relatively similar analytic expression for the gradient of an $l_2$-penalty, see discussion in the supplemental material.

Next, we introduce Wirtinger derivatives [Remmert 2012] as a gradient approximation that is defined. Specifically, in Section 4.3, we discuss computing Part I of Equation 9 which is the derivative of the scalar error with respect to the complex wave field on the image plane. Part II of the chain rule expression in Equation 9 depends on the propagation model. We derive this derivative for the convolutional propagation model in Section 4.4, to which we apply Part III. We derive Wirtinger derivatives for other propagation models in the supplemental material.

4.3 Wirtinger Derivatives

To overcome the undefined nature of the gradient of Part I, we use the following approximation for partials of a scalar function of a complex vector $f: \mathbb{C}^n \mapsto \mathbb{R}$ $$d(Err) = df(z) = \text{Re}\langle \nabla f, dz \rangle,\qquad(10)$$

where Re denotes the real part of a complex number and $\langle ., . \rangle$ denotes the inner product of two vectors. This definition, although not the exact gradient, is consistent with the main properties of gradients used in first-order optimization methods: 1) the gradient defines the direction of maximal rate of change of the function, and 2) the gradient being zero is a necessary and sufficient condition to determine a stationary point of a function. To obtain $\nabla f$, we compute the Wirtinger derivatives of the function $f$ with respect to the complex argument z. Assume $f(z)$ to be a function of two independent vectors z and $\bar{z}$, its Wirtinger derivative can be defined as $$\begin{aligned}df &= (\nabla_z f)^T dz + \underline{(\nabla_{\bar{z}} f)^T d\bar{z}} \qquad(11)\\ &= (\nabla_z f)^T dz + \overline{(\nabla_z f)^T dz}\\ &= 2\text{Re}((\nabla_z f)^T dz)\\ &= \text{Re}\langle 2\nabla_z f, dz\rangle\end{aligned}$$

We simplify the computation of $\nabla f(z)$ as a scaled gradient of $f$ with respect to only $\bar{z}$ $$\nabla f(z) = 2\nabla_{\bar{z}} f.\qquad(12)$$

Equation 12 is valid for any general scalar function of complex variables. However, following Equation 5, we further decompose Equation 12 as $$\nabla_{\bar{z}} f = \underbrace{\frac{df}{d(|z|^2)}}_{A} \circ \underbrace{2\nabla_{\bar{z}}(|z|^2)}_{B}.\qquad(13)$$

Note that $|z|^2$ is the intensity of the reconstructed image on the image plane. The derivative of a scalar loss with respect to the reconstructed holographic image (Part A) is defined for any differentiable penalty function—even for a neural-network based loss function, where one can obtain gradients using back propagation. To plug a custom loss function, standard or neural network learned, into our framework only requires a Hadamard product of the gradient of the error function with respect to the predicted image (Part A) and the Wirtinger derivative of field intensity on the image plane (Part B), which is given by the scaled value of the field itself as $$2\nabla_{\bar{z}}(|z|^2) = 2\nabla_{\bar{z}}(z\bar{z}) = 2z.\qquad(14)$$

For example, for an $l_2$-penalty, i.e., setting $f(\cdot)=\|\cdot\|^2$, the value of $\nabla f$ can be obtained as follows $$\nabla f = 2\nabla_z f \qquad (15)$$

$$= \underbrace{\frac{d\left(\frac{1}{2}\||z|\|^2 - I\|^2\right)}{d(|z|^2)}}_{A} \circ \underbrace{2\nabla_z(|z|^2)}_{B}$$

$$= 2(|z|^2 - I) \circ 2z$$

Note: In the following sections, vec denotes the vectorization operator for a multi-dimensional signal, F[.] denotes a Discrete Fourier Transform (DFT) operator applied to multi-dimensional signal, and F represents the corresponding matrix applied to the vectorized signal, in the sense that $$\mathcal{F}[H] = F\text{vec}(H). \qquad (16)$$

The operator $\circ$ denotes the element-wise (Hadamard) product, and $F^\dagger$ is the Hermitian (conjugate transpose) of F. In the following, we use the fact that F is unitary, and therefore $F^{-1}=F^\dagger$. We introduce the DFT matrix F here for notational brevity. In practice, the DFT is performed by the Fast Fourier Transform (FFT) algorithm and the matrix F is never explicitly constructed. Note also that H is a function of $\Phi$, the phase that we are interested in, and FH actually means F vec(H), as shorthand notation. All multiplications, unless specifically stated, are element-wise multiplications.

Next, we derive the gradient for the convolutional propagation model from Sec. 3.2. Please refer to the supplemental material for the gradients for other propagation models.

4.4 Gradient for Convolutional Propagation

As discussed in Section 3.2, the image on the destination plane can be computed as $I'=|H*L|^2$. Expressing convolution as a multiplication in the Fourier domain, the wave field at the destination plane can be obtained as $z=F^{-1}(F[H] \circ F[L])$. Deriving Part II from the partial computed in Equation 10 yields $$d(Err(H)) = \text{Re}\langle \nabla f, dz \rangle \qquad (17)$$
$$= \text{Re}\langle \nabla f, d(F^\dagger(FH)(FL)) \rangle$$
$$= \text{Re}\langle \nabla f, F^\dagger FLFdH \rangle$$
$$= \text{Re}\langle F^\dagger(FL)^\dagger F\nabla f, dH \rangle$$
$$= \text{Re}\langle F^\dagger(FL)*F\nabla f, dH \rangle$$

Finally, evaluating Part III with $H=\exp^{j\Phi}$, we derive the partial of the loss function with respect to the phase $\Phi$ as follows $$d(Err(\Phi)) = \text{Re}\langle F^\dagger(FL)*F\nabla f, d(\exp^{j\phi}) \rangle \qquad (18)$$
$$= \text{Re}\langle -j\exp^{-j\phi}F^\dagger(FL)*F\nabla f, d(\phi) \rangle$$

Since the phase $\Phi$ is real-valued, the above inner-product becomes the gradient, that is $$\nabla Err(\Phi) = \text{Re}(-j\exp^{-j\Phi}F^\dagger(FL)*F\nabla f). \qquad (19)$$

5 Setup and Implementation

We assess the holograms computed by the proposed method in simulation and experimentally using a hardware display prototype. We use several loss functions, including a neural network based learned perceptual error metric, and compute all the corresponding gradients according to Section 4.3.

5.1 Hardware Prototype

The prototype display system for experimental validation is similar to the one demonstrated by Maimone et al. [2017] but differs in a variety of implementation details. We use plane wave illumination in the projection light engine. Our prototype display includes a HOLOEYE LETO-I liquid crystal on silicon (LCoS) reflective phase-only spatial light modulator with a resolution of 1920×1080. The pixel pitch of the SLM is 6.4 µm, resulting in the active area of 12.28 mm x 6.91 mm. We use a single optical fiber that is coupled to three laser diodes emitting at wavelengths 446 nm, 517 nm, and 636 nm, in combination with collimating optics, to illuminate the SLM. The laser power is controlled by a laser diode controller, and the output is linearly polarized as required by the SLM. The SLM has a refresh rate of 60 Hz and is illuminated by the laser source in a color field sequential manner.

Figure 8:
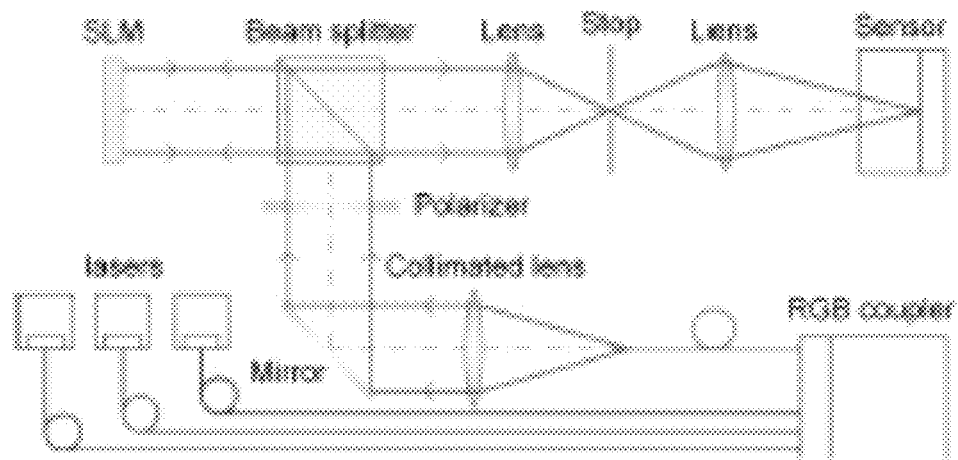
FIG. 8 (top) is a schematic diagram of our prototype holographic near-eye display.
Figure 8:
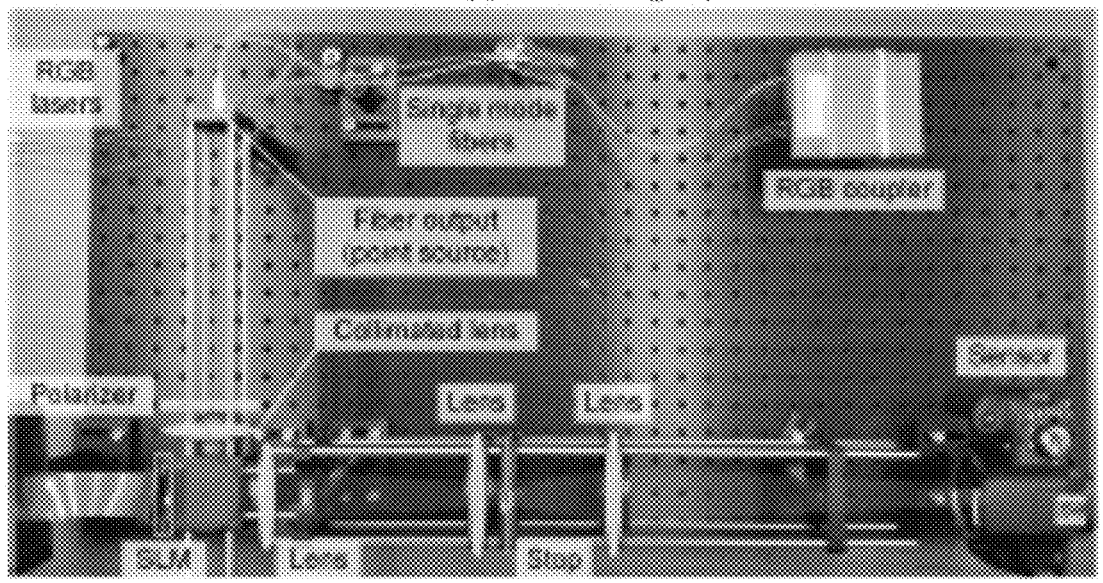

FIG. 8 shows the optical design of the proposed prototype system. The light from the laser diodes is collimated using an achromatic doublet before being modulated by the LETO phase SLM, and then focused by a 150 mm achromatic lens. An iris is placed at an intermediate image plane to discard unwanted higher diffraction orders, especially for double phase encoding holograms. Finally, a combination of 80 mm and 150 mm achromatic lenses is used to relay the image to the SLM sensor plane. An optional zero-order stop can be placed immediately after the 80 mm achromat. The optical relay lens system was optimized to have minimal aberrations, allowing a fair evaluation of different methods with well-corrected images. To assess the display's image quality, we capture images from the prototype holographic display using a Canon Rebel T6i DSLR camera body (without camera lens attached) with an output resolution of 6000× 4000, and a pixel pitch of 3.72 µm.

Note that achieving higher image quality in our experimental setup requires an intermediate image plane where a zero-order stop, and other filter stops can be placed to filter out undiffracted and higher-order diffracted light. Using off-the-shelf optics to create a high-quality image relay resulted in a fairly long optical system. Miniaturizing our setup to an actual head-mounted display remains an exciting area of future research.

5.2 Implementation

We compute phase-only holograms on a PC with an Intel Xeon2.4 GHz CPU and 64 GB of RAM, and an NVIDIA GeForce GTX 1080GPU. For quadratic loss functions we use quasi-Newton optimization and implement the proposed method in MATLAB using the L-BFGS [Liu and Nocedal 1989] quasi-Newton method. In particular, we use the minFunc optimization package [Schmidt 2005]. For loss functions requiring stochastic gradient optimization, such as neural-network based losses, we implement the proposed method in TensorFlow [Abadi et al. 2016] and use the Adam optimizer. Specifically, we use a learning rate of 0.001 and an exponential decay rate of 0.9 for the first moment estimate, and an exponential decay rate of 0.999 for the second moment estimate. We obtain the gradient for the loss function component (i.e., Part I of Equation 9) from backpropagation in TensorFlow, especially for losses parameterized by convolutional neural networks. We then use this gradient to compute the complex Wirtinger gradient (i.e. Part II and Part III of Equation 9) and feed it back to the optimizer for computing optimal phase holograms. Full color holograms are generated by performing optimization sequentially for all three color channels.

To compare runtimes of our Wirtinger Holography algorithm against the state of the art modified-GS method [Peng et al. 2017] and double phase amplitude encoding of Fresnel holograms [Maimone et al. 2017], we measure computation time needed to generate a 1920×1080 hologram both on MATLAB running only on CPU, and on Tensorflow with native GPU support.

MATLAB. We compute phase holograms on a per-channel basis on the CPU, in MATLAB, for all three methods. The double phase encoding method, using only one convolution, is the fastest with only 7 sec on MATLAB when performed using FFTs for a large lens kernel size. The Modified GS algorithm takes about 95 sec for 60 iterations for generating a full HD image. Note that increasing the number of iterations also increases the quality of GS hologram. Without warmstarting and initializing with random phase, our MATLAB implementation takes about 70 sec to typically surpass a PSNR of 30 dB in about 20 iterations.

TensorFlow. To compute phase patterns for all three colors using TensorFlow with GPU acceleration, modified GS takes about 40 sec for 60 iterations, double phase encoding method takes about 10 ms while our method, initialized with random phase, takes about 30 sec before reaching a PSNR of over 30 dB in about 200 iterations using the Adam optimizer with the parameters discussed above.

Note that the runtimes for Wirtinger Holography is comparable or less than that of modified GS algorithm, and achieve significant quality improvement in very few iterations.

6 Analysis

In this section, we analyze the proposed method in simulation, and we validate its flexibility for different objective functions, forward models and setup configurations in simulation. First, we compare our approach against the state-of-the-art holographic phase retrieval methods from [Peng et al. 2017], which is a modified Gerchberg-Saxton method (GS), and the double phase holography method (DPH) proposed in [Maimone et al. 2017]. For quantitative comparisons of the reconstructed holographic images, we evaluate peak signal-to-noise ratio (PSNR) as a mean-squared error metric, and structural similarity Index (SSIM) for perceptual image quality.

Figure 9:
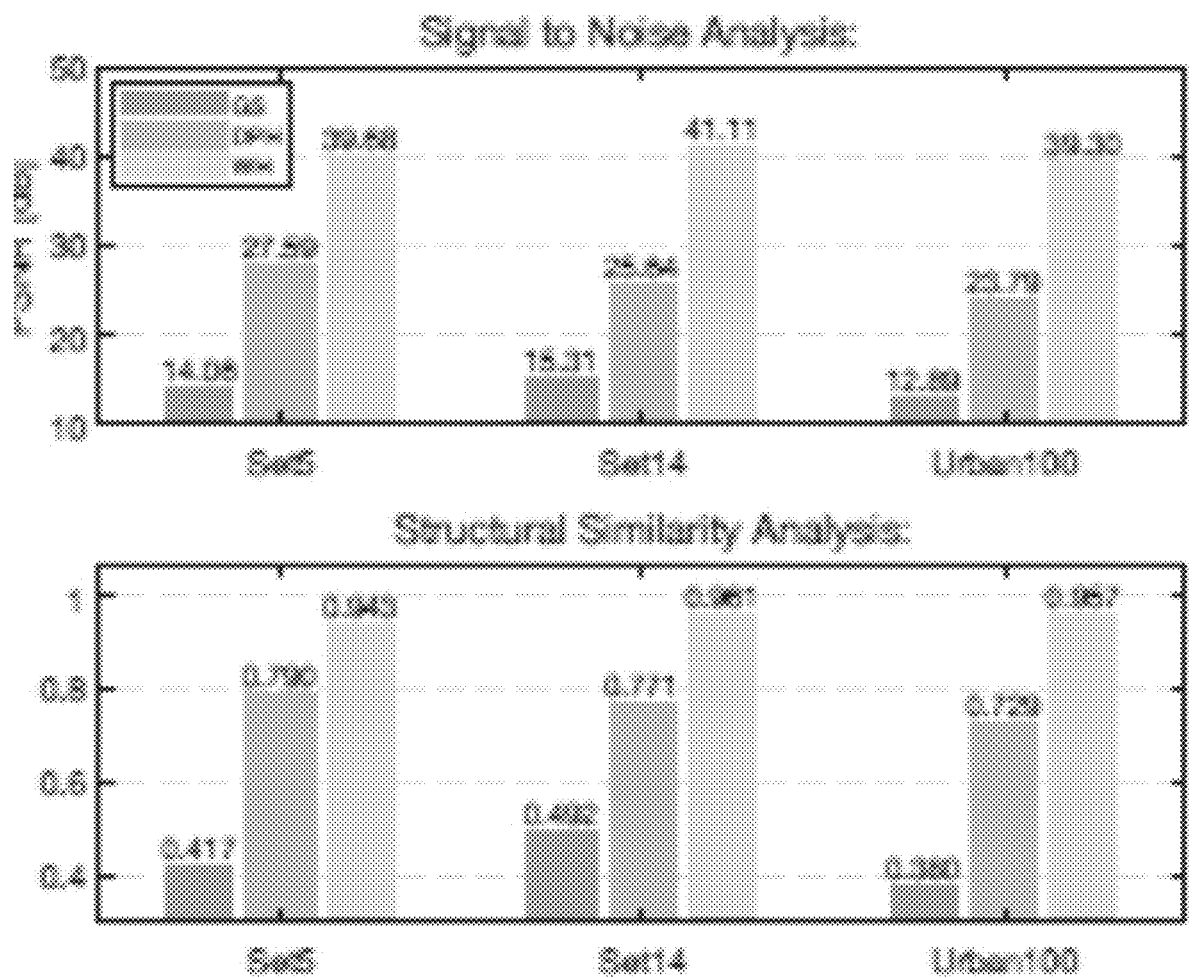
FIG. 9 includes graphs illustrating an evaluation of reconstructed holographic images for three different datasets. The GS-based phase retrieval and our algorithm ran until the PSNR values were converged. The evaluation is done on grayscale images for a 532 nm green laser source.

FIG. 9 lists PSNR and SSIM metric evaluation results for the proposed method, using anl2loss and convolutional forward model, compared against modified GS phase retrieval, and DPH, over the following super-resolution image benchmark datasets: SetS [Bevilacqua et al. 2012], Set14 [Zeyde et al. 2010] and Urban100 [Huang et al. 2015b]. Among these datasets, SetS and Set14 consist of natural scenes and Urban100 contains challenging urban scenes images with details in different frequency bands. For a fair comparison, the intensity of the reconstructed images is adjusted to have the same mean value as their corresponding target images, as proposed in [Yoshikawa et al. 2016].

Figure 10:
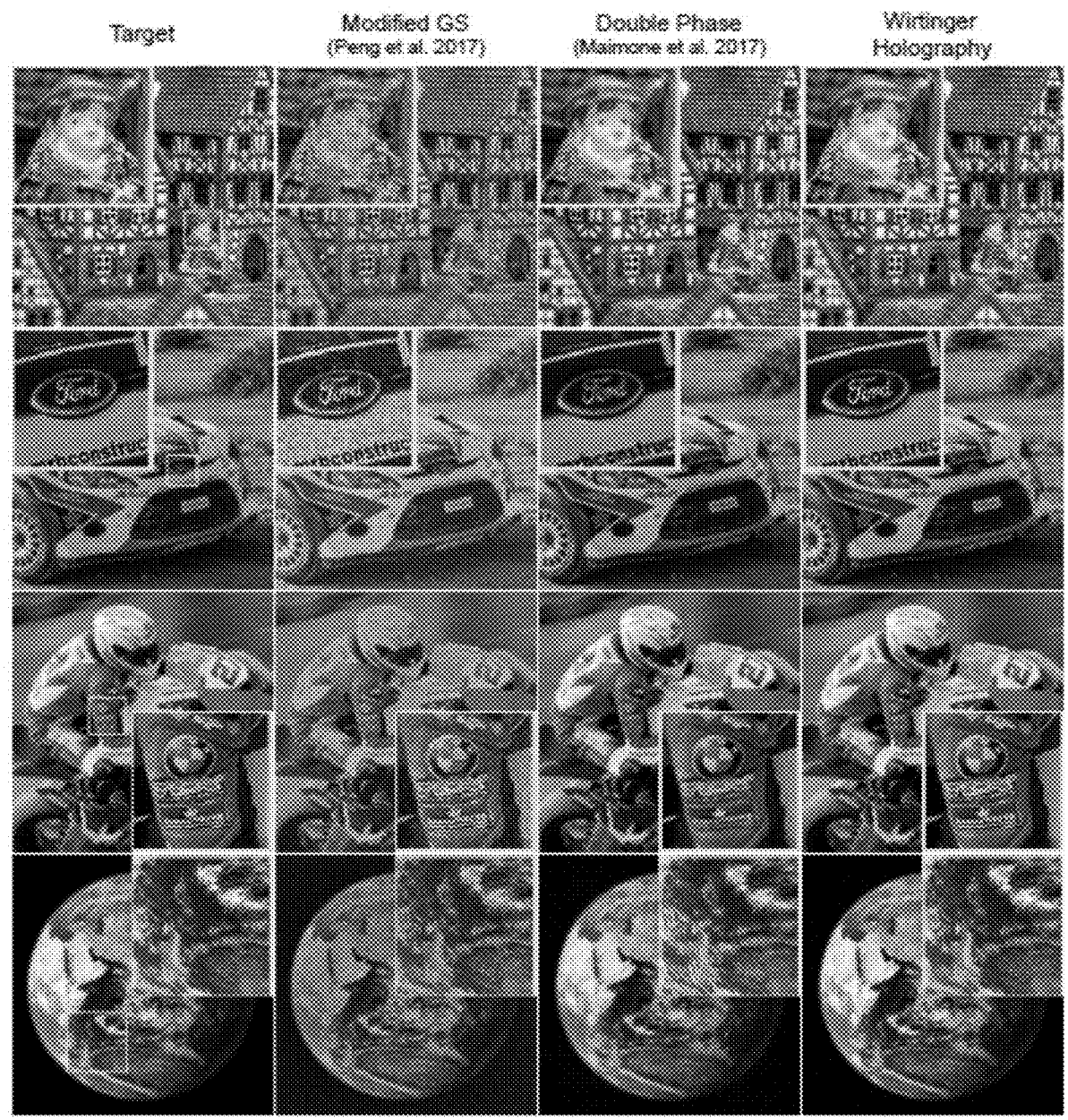
FIG. 10 includes images illustrating synthetic results reconstructed from holograms generated using different algorithms. From left to right, we show the reference, reconstructed results of modified GS iterative algorithm, double phase amplitude encoding direct propagation method, and the proposed Wirtinger holography, respectively. Note, for this comparison we set the propagated distance 200 mm, hologram pixel pitch 6.4 µm, and three principal wavelengths 638 nm, 520 nm, 450 nm for assessment. The reconstructed images are a Christmas motif by Couleur, Rally by Dimitris Vestsikas, Motorbike by Steve Sewell, and Earth by Wikilmages.

We find that our method produces superior reconstruction quality approaching 40 dB on an average. The proposed method outperforms double phase encoding holograms by more than 10 dB across all datasets and the modified GS method from [Peng et al. 2017] by more than 20 dB on average. Also note that the SSIM measurements validate that our method produces reconstructions with perceivably fewer errors as compared to double-phase holograms. FIG. 10 shows qualitative comparisons for selected image patches.

Additional examples are provided below in the section entitled Supplementary Information for Wirtinger Holography for Near-eye Displays.

Resolution. The double phase encoding method from Maimone et al. [2017] produces a good approximation of the target image. However, encoding a single complex value into two phase values results in loss of resolution in holographic images. In contrast, our method produces high quality reconstructions without significant loss of resolution. For example, notice the enhancement of text in FIG. 10 (rows 2 and 3), and the reproduction of details (3rd row).

Ringing. Ringing is a ripple artefact that occurs near sharp edges. Although ringing artefacts from double phase encoding are subtle for smooth images, they are prominent in images with high frequency details. These artefacts are particularly apparent as they can differ in the color channels, resulting in chromatic ringing. The last row of FIG. 10 shows an extreme case where ringing significantly degrades the holographic image quality produced by a double phase hologram. In contrast, the proposed method produces a faithful reconstruction of the image.

Noise and Contrast. Compared to the modified GS method from Peng et al. [Peng et al. 2017], the proposed method suffers from significantly less reconstruction noise, an artefact type typical to Gerchberg-Saxton-style methods. Moreover, Wirtinger Holography allows for improved contrast and reduced chromatic artefacts due to the improved quality across all color channels.

6.0.1 Alternative Penalty Functions. To validate the flexibility of the proposed framework, we show results for three different penalty functions for the proposed setup and the convolutional forward model. We evaluate the following penalty functions (see Sec. 4.1):1) $l_2$-norm least-squares objective 2) MS-SSIM [Wang et al. 2003] error minimization as a hand-crafted perceptual accuracy 3) the learned perceptual similarity metric [Zhang et al. 2018] as a deep neural network perceptual quality metric.

Figure 11:
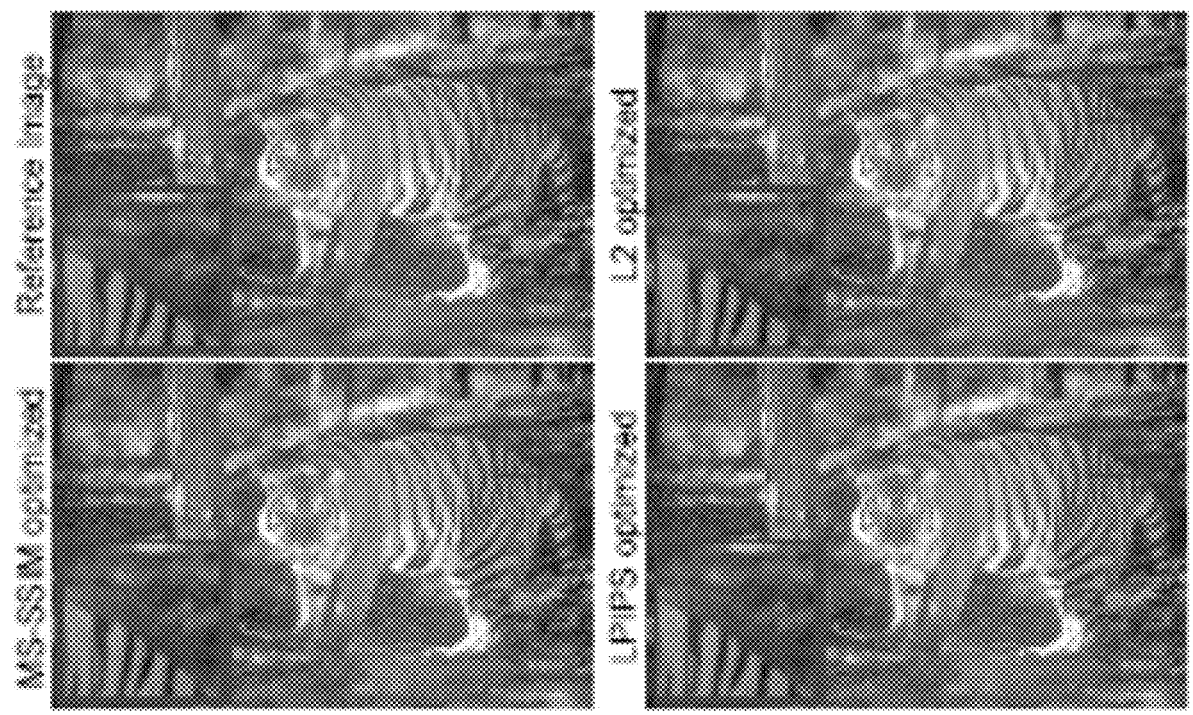
FIG. 11 illustrates quantitative and qualitative assessments of applying different penalty functions for the proposed Wirtinger holography method.

FIG. 11 shows evaluations on a custom dataset of 20 images randomly picked from Set5, Set14, Urban100 and BSDS100 [Martin et al. 2001] datasets to cover images with a range of spatial frequencies. Optimizing for hand-crafted or learned perceptual loss metrics improves the respective metric value by a significant margin over a least-squares loss function. The margin between the learned LPIPS loss and the least-squares loss is the largest with about 3.5 dB or 0.02 in SSIM. Note that the LPIPS loss function offers the best performance in all three image quality metrics, illustrating the promise of our flexible framework for future research on formal optimization for phase retrieval. The qualitative examples on the top in FIG. 11 show perceptually strong differences especially in uniform and smooth regions, where localized errors average out in the least-squares estimate but are penalized by the learned perceptual metric.

6.1 Generalization to Alternative Optical Designs

Figure 12:
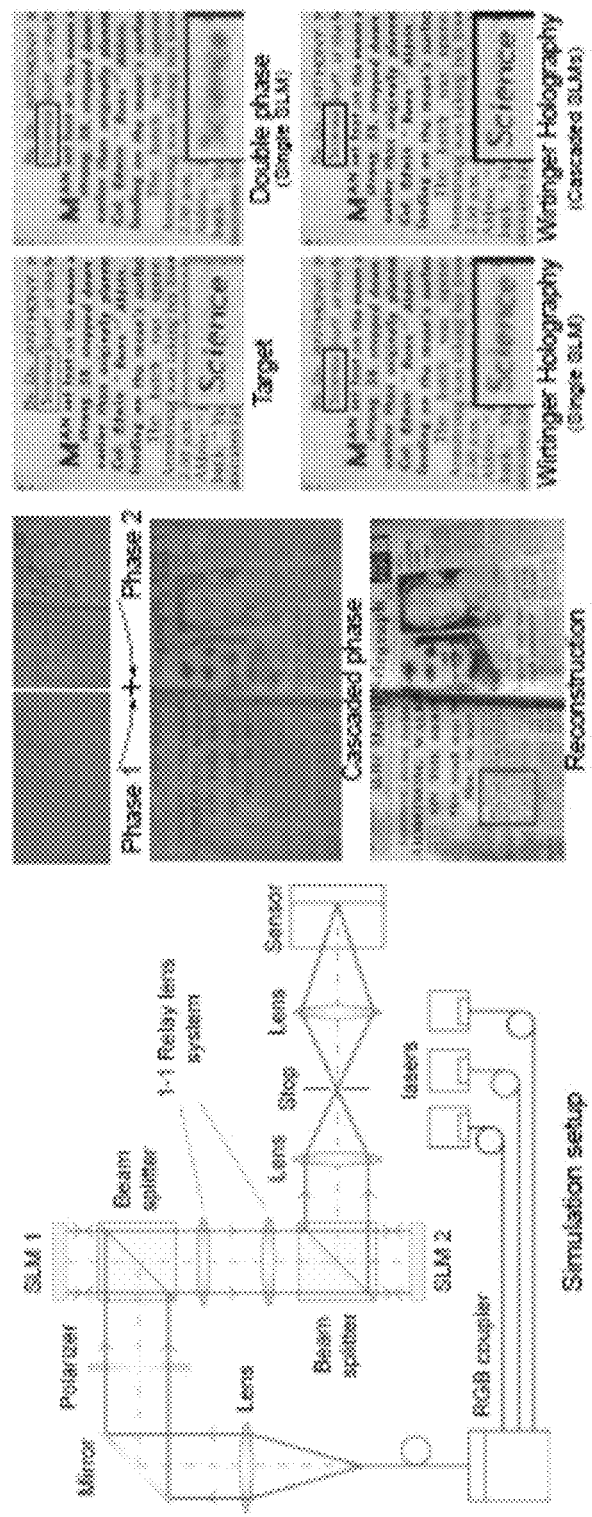
FIG. 12 illustrates a schematic of a setup for realizing a cascaded SLM holographic display (left), where two SLMs are relayed by optics to perform the phase modulation defined by complex matrix multiplication. The two-phase hologram superresolves a high-resolution phase hologram that corresponds to reconstruct a high-quality image (center). Synthetic comparison results produced by different solutions are shown (right). The images that were holographically encoded were obtained from Sandid/Pixabay.

To demonstrate the ability of the proposed method to generalize to other optical setups, we also simulate a stacked setup of two cascaded SLMs, illustrated in FIG. 12. For conventional transmissive displays, stacking two displays with a lateral offset of half a pixel has allowed researchers to synthesize images with greater spatial resolution than that afforded by any single SLM [Heide et al. 2014]. We apply this idea to holographic display generation. Instead of calculating a spatially super-resolved hologram and decomposing it into two stacked layers using complex matrix factorization [Peng et al. 2017], our framework facilitates end-to-end optimization of cascaded holograms.

A cascade of two phase-only modulators combine additively in phase, or multiplicatively in their complex wave fields. Optically cascading a first SLM (A) with phase $\phi_A$ of M pixels, and a second SLM (B) with phase $\phi_B$ of M pixels, results in a complex wave field that can be expressed as:

$$H = e^{j\Gamma_{AB}\Phi_A} \circ e^{j\Gamma_{BA}\Phi_B} = \exp^{j(\Gamma_{AB}\Phi_A + \Gamma_{BA}\Phi_B)}, \quad (20)$$

where $\Gamma_{AB}$ and $\Gamma_{BA}$ are sparse transformation matrices of size 4 M×M that model the relative pixel shifts of the two phase-SLMs with respect to a 2× higher-resolution virtual SLM with 4 M pixels. Specifically, $\Gamma_{AB}$ maps one pixel from SLM A to four pixels from the virtual SLM, and similarly $\Gamma_{BA}$ represents the mapping for SLM B. For a half-pixel shift between both SLMs, these two matrices are binary matrices. The above equation can be easily plugged into our forward model, and the individual SLM phase patterns can be computed as $$\Phi_{opt,A}, \Phi_{opt,B} = \underset{\Phi_A, \Phi_B}{\text{minimize}} f\left(|\mathcal{P}(\exp^{j(\Gamma_{AB}\Phi_A + \Gamma_{BA}\Phi_B)})|^2, I\right) \quad (21)$$

We simulate two reflective mode phase-only SLMs with the specifications of the HOLOEYE LETO used in our hardware prototype, but with half the resolution (i.e. 960×540) in both dimensions to generate a hologram of four times the size of any SLM (i.e. 1920×1080). FIG. 12 shows simulated reconstruction of images produced by a dual-SLM cascaded holographic display. Notice that the cascaded hologram spatially superresolves the image by a factor of four, i.e. twice as many pixels along each axis. The cascaded hologram offers fine detail with high contrast. While this approach effectively promises next generation results with currently available SLM hardware, we note that, in practice, alignment and calibration of the overlap might be challenging without micron-accurate mechanical alignment methods, and hence require significant engineering effort to enable efficient manufacturing processes.

6.2 3D Holograms

Although the focus of the proposed method is on improving the quality of 2D holographic images, our optimization framework can be extended to 3D volumetric scenes. One can slice the 3D scene into multiple depth planes and superpose all complex holograms corresponding to each depth plane, thereby forming a true 3D hologram. However, this method is not optimal and causes slow down of a factor proportional to the number of depth planes, and also will not support smooth depth changes. One option is to generate 2D holograms approximating spatially variant focus by fast depth switching. With gaze tracking, we can measure the depth at which the user is looking and compute the complex 2D hologram by changing the focus of the scene to that depth, providing precise focus in the fovea region [Maimone et al. 2017]. In other words, we can render a dense focal-stack in lieu of computing the full 3D holo-gram, thereby addressing the vergence-accommodation conflict (see FIG. 16). Since the eye can focus only at a single depth any given time, presenting depth of field blur for points close to each other within the fovea region can be addressed in the image space [Cholewiak et al. 2017]. Please refer to sub-section 3 of the Supplementary Information section below.

7 Assessment

Figure 13:
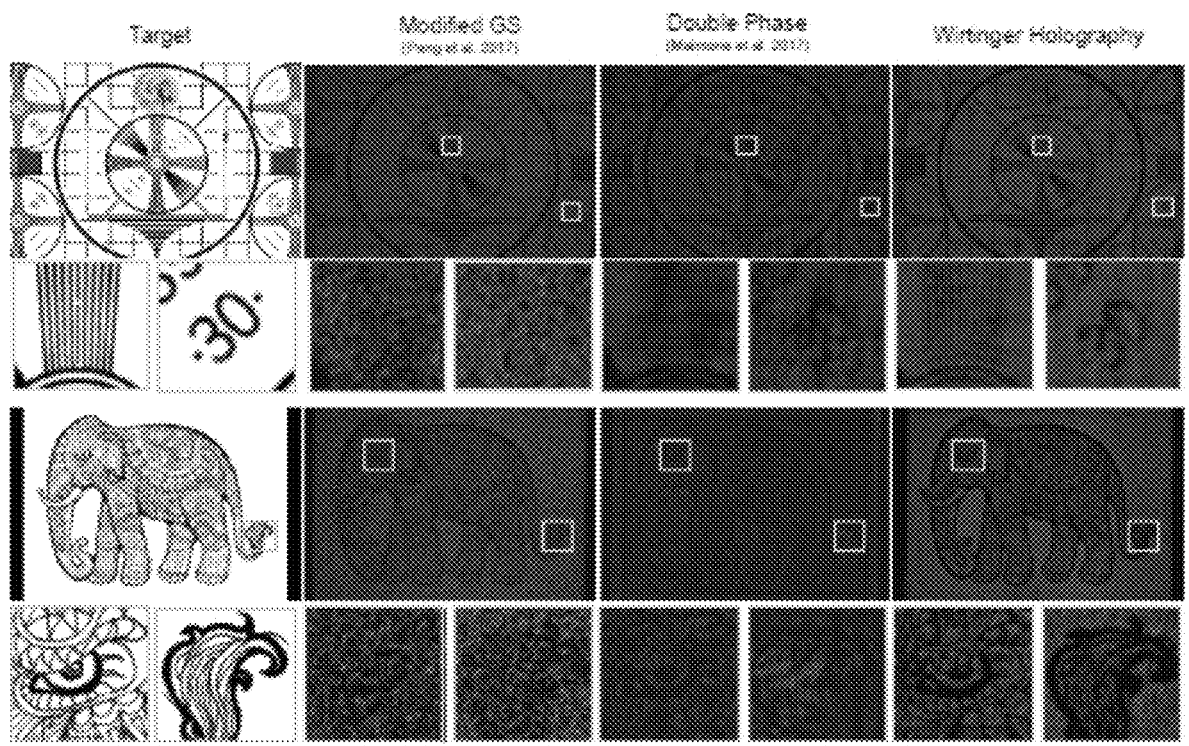
FIG. 13 illustrates experimental results for existing holographic phase retrieval methods on our prototype display. We show here single-color reconstructions for the green and red wavelength channels of our system. The phase-only holograms used in this prototype are provided in the section entitled Supplementary Information for Wirtinger Holography for Near-Eye Displays. The images in each row are captured with same camera settings, using ISO 100 and the same exposure time of 10 ms.
Figure 14:
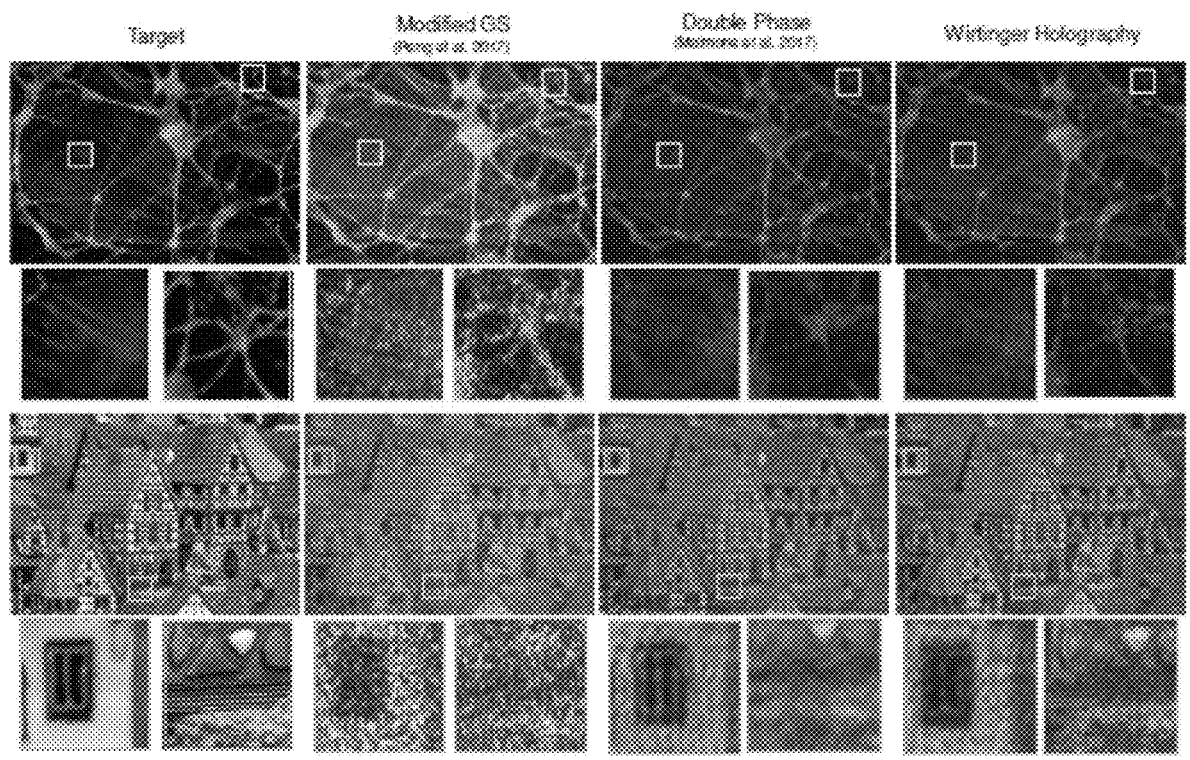
FIG. 14 illustrates experimental results for existing holographic phase retrieval methods on our prototype display. We present RGB color images with each color channel captured sequentially. The phase-only holograms used in this prototype are provided in the section below entitled Supplementary Information for Wirtinger Holography for Near-Eye Displays. The images in each row are captured with the same camera settings, using ISO 100 and an exposure time of 10 ms. We have tuned the output power of three lasers before acquisition to approximately white-balance the illumination. The actin cell image was captured by Jan Schmoranzer.

FIG. 13 and FIG. 14 show experimentally acquired results from the prototype system presented in Section 5. We validate the proposed method by comparing different holographic phase retrieval methods in full color and for individual single-wavelength channels.

The results in FIG. 13 demonstrate that the proposed approach suppresses most of the severe artefacts present in existing methods. Specifically, reconstruction noise, as in the flat areas for the GS holograms, and ringing, as for the periphery in the TV line chart, limit the achieved resolution of previous methods. GS phase retrieval preserves high light efficiency, while its iterative projection of a random phase update on the image plane end inevitably causes severe reconstruction noise. The DPH method leads to the unwanted effect of a noticeable portion of light escaping the designated area. Moreover, it creates multiple higher-order twin images and suffers from severe ringing around high-contrast edges and in the periphery, which are particularly visible in the binary image in the second row of FIG. 13. The proposed Wirtinger holography method recovers fine detail while suppressing severe ringing and reconstruction noise, resulting in improved resolution validated in the TV line chart areas in the top row of FIG. 13.

The full color results in FIG. 14 confirm the trend of the single channel reconstructions. The proposed approach reduces ringing and reconstruction noise present in existing methods. As a result, fine details, as for the tiles on the roof of the houses or the microtubules in FIG. 14, are displayed more faithfully with reduced chromatic artefacts. While this validates the proposed method, the margin compared to previous methods is not on par with the simulation results. This is due to residual artefacts resulting from a number of limitations of our specific low-cost prototype, which we note are not fundamental to the proposed method. As our prototype SLM is unsupported due to its age, we were only able to rely on the available look-up-tables, which did not match the wavelengths of our laser configuration. This results in inaccurate phase delays which severely affects methods relying on accurate forward models, such as the GS and proposed method. Moreover, the absence of a zero-order stop affects all methods uniformly in the proposed setup. Refer to the supplement for additional analysis. We note that even with these prototype limitations the proposed method outperforms existing holographic phase retrieval methods.

8 Discussion and Conclusion

We have presented a phase retrieval method for holographic near-eye displays, which departs from existing heuristic algorithms, and instead relies on formal optimization using complex Wirtinger derivatives. This framework has allowed us to formulate holographic phase retrieval as a quadratic optimization problem that can be solved using first-order optimization methods. We have validated that the resulting holograms have an order of magnitude lower error, i.e., more than 10 dB PSNR improvement, when compared to recent state-of-the-art approaches. We have assessed the proposed method in simulation and using an experimental prototype system. Wirtinger holography eliminates the severe artefacts present in existing methods, and, in particular, enables us to minimize ringing and chromatic artefacts.

Although the proposed method provides unprecedented accuracy, its runtime is only comparable to that of the modified Gerchberg-Saxton method [Peng et al. 2017], with about 30 sec for a full HD hologram on a consumer laptop computer. However, note that we implemented our framework using high-level languages, without manual low-level code optimization, to allow for rapid adoption by researchers. Moreover, we do not use dedicated hardware for our holographic display algorithm. In the future, we envision efficient implementations or dedicated display hardware to overcome these limitations and achieve real-time frame rates, similar to how recent dedicated hardware made real-time ray tracing possible.

In addition to reducing error by an order of magnitude when compared to existing methods, we have validated the flexibility of the proposed system. Specifically, we have shown that Wirtinger holography facilitates the use of almost arbitrary penalty functions in a plug-and-play fashion, even including learned perceptual losses parametrized by deep neural networks, the use of different first-order optimization methods, including stochastic optimization methods, and that the proposed framework can be applied to different optical setup configurations. As such, Wirtinger holography paves the road towards high-quality artefact-free near-eye holographic displays of the future and enables future research towards this vision.

Supplementary Information on Wirtinger Holography for Near-Eye Displays

1 Introduction to Wirtinger Calculus

In this section, we provide a quick introduction to Wirtinger calculus and Wirtinger derivatives in the context of optimization problems which involve derivatives of a complex variable. However, we refer interested readers to [Remmert 2012] for a detailed discussion on complex functions and analysis. Consider a real-valued function of a real variable, for instance:

$$f: \mathbb{R} \ni x \mapsto y = f(x) \in \mathbb{R}, \tag{1}$$

the point $x_{opt}$, where $f(x)$ is maximum (or minimum) is obtained by taking the derivative of $f$ concerning $x$ and setting it zero. In other words, for $x_{opt}$, the following equation has to be valid $$\left. \frac{df}{dx} \right|_{x_{opt}} = 0. \tag{2}$$

Note that here we assume $f(x)$ to be continuous in some domain $\mathbb{D}$, and the derivative to exist. However, whether the obtained solution gives a maximum or minimum value needs to be checked using additional conditions or higher-order derivatives.

We can define the derivative for a complex function of a complex variable, for instance $$f: \mathbb{C} \ni z \mapsto w = f(z) \in \mathbb{C}, \tag{3}$$

as follows $$f'(z_0) = \left. \frac{df}{dz} \right|_{z_0} = \lim_{z \to z_0} \frac{f(z) - f(z_0)}{z - z_0}. \tag{4}$$

If $f'(z)$ exists in the domain $\mathbb{D} \subset \mathbb{R}$, the function $f(z)$ is called ananalytic or a holomorphic function in $\mathbb{R}$.

Now, a given complex function can be decomposed into two real functions, each depending on two real variables, say x and y, which are the real and imaginary parts of the complex variable z. Mathematically, this can be represented as $$f(z) = f(x+jy) = u(x, y) + jv(x, y); z = x + jy \tag{5}$$

It can be shown that for the above function $f(z)$ to be holomorphic, the corresponding component functions u(x,y) and v(x,y) need to satisfy the Cauchy-Riemann conditions [Remmert 2012]

$$\frac{\partial u(x, y)}{\partial x} = \frac{\partial v(x, y)}{\partial y} \tag{6}$$

$$\frac{\partial v(x, y)}{\partial x} = -\frac{\partial u(x, y)}{\partial y} \tag{7}$$

If the above conditions are valid, then the complex derivative of a holomorphic function $f(z)$ can be expressed by the partial derivatives of the component real functions u(x, y) and v(x, y) as $$\frac{df(z)}{dz} = \frac{\partial u(x, y)}{\partial x} + j \frac{\partial v(x, y)}{\partial x} \tag{8}$$

1.1 Real Functions of Complex Variables

As mentioned in the main manuscript, it can be seen from Equation 8 that if the function $f(z)$ is a real valued function, then the component function v(x, y) which forms the imaginary part of $f(z)$ is zero, i.e. v(x, y)=0. Following Cauchy-Riemann conditions as described in Equation 6, we see that $$\frac{\partial u(x, y)}{\partial x} = \frac{\partial v(x, y)}{\partial y} = 0 \tag{9}$$

Thus, u(x, y) is always a constant, and so is the function $f(z)$, and the derivative of such a function is always zero. In other words, a real function of complex variable is not holomorphic unless it is a real constant.

To work around this, instead of treating $f(z)$ as a real function of a complex variable, we regard $f(z)$=u(x, y) as a function of two real variables. In the context of solving an optimization problem, it can be treated as a multidimensional real function. Therefore, to find the optimum value of $f(z)$, we want to find the optimum of u(x, y), which requires $$\frac{\partial u(x, y)}{\partial x} = 0 \text{ and } \frac{\partial u(x, y)}{\partial y} = 0 \tag{10}$$

Note that v(x, y)=0 since the function is real valued.

Both of the above real-valued equations for the optimal components $x_{opt}$ and $y_{opt}$ can be linearly combined into a more compact one complex-valued representation as follows $$\alpha_1 \frac{\partial u(x, y)}{\partial x} + j \cdot \alpha_2 \frac{\partial u(x, y)}{\partial y} = 0 + j0 = 0 \tag{11}$$

where α1 and α2 are arbitrary real valued non-zero constants. Note that the above representation is valid since the real and imaginary parts are orthogonal, and the linear combination is only intended to devise a compact representation.

Let us now define a differential operator writing the real and imaginary parts of z=x+jy as the tuple (x,y)

$$\frac{\partial}{\partial z} = \alpha_1 \frac{\partial}{\partial x} + j \cdot \alpha_2 \frac{\partial}{\partial y}. \tag{12}$$

Note that the operator defined in Equation 12 can also be applied to complex functions, because real cost functions can often be decomposed into complex components, for example $f(z) = |z|^2 = z \cdot \bar{z} = f_1(z) f_2(z)$, where $f_1(z) f_2(z) \in \mathbb{C}$. Also, observe that z̄=x−jy the complex conjugate of z=x+jy.

The choice of values α1=½ and α2=−½ meets the requirements for defining the complex derivatives, and it was first introduced by Wilhelm Wirtinger. Wirtinger derivatives of a (complex) function $f(z)$ of a complex variable $z=x+jy$ are defined as the following linear partial differential operators of the first order $$\frac{\partial}{\partial z} = \alpha_1 \frac{\partial}{\partial x} + j \cdot \alpha_2 \frac{\partial}{\partial y}. \tag{13}$$

and $$\frac{\partial f}{\partial \bar{z}} = \frac{1}{2} \cdot \left( \frac{\partial f}{\partial x} + j \cdot \frac{\partial f}{\partial y} \right) \tag{14}$$

For functions of many variables, $f: \mathbb{C}^n \ni z=[z_1, z_2, \ldots, z_n]^T \mapsto w=f(z) \in \mathbb{R}$, all n partial derivatives with respect to the complex variables $z_1, \ldots, z_n$ need to be calculated. In other words, the derivatives need to be calculated and combined into a vector again, and this gradient of the function can be defined as follows $$\frac{\partial f}{\partial z} = \begin{bmatrix} \frac{\partial f}{\partial z_1} \\ \frac{\partial f}{\partial z_2} \\ \vdots \\ \frac{\partial f}{\partial z_n} \end{bmatrix} \text{ and } \frac{\partial f}{\partial \bar{z}} = \begin{bmatrix} \frac{\partial f}{\partial \bar{z}_1} \\ \frac{\partial f}{\partial \bar{z}_2} \\ \vdots \\ \frac{\partial f}{\partial \bar{z}_n} \end{bmatrix} \tag{15}$$

Of course, the Wirtinger gradients defined in Equation 15 has to be equal to the zero vector $0=[0,0, \ldots, 0]^T$. Note that for such multidimensional functions, one can separate and inspect individually the real and imaginary parts. But using the above definition, we can use simple arithmetic rules that can be expressed using vectors and matrices. This flexibility allows us to use formal optimization methods easily.

2 Additional Discussion on Image Formation Models

In this section, we describe additional propagation models which can be incorporated by the proposed method.

2.1 Fourier Transform-based Propagation

A further simplification, in addition to the convolutional approximation from the main manuscript, is a parabolic approximation that can be made to remove the square root operation in the Euclidean distance term in Equation 2 in the main manuscript to obtain a more convenient Fresnel scalar diffraction model. However, this propagation constrains the sampling on the image plane, which is determined by the wavelength and propagation distance from the hologram. Also, the sampling pattern on the image plane is restricted by the sampling pattern on the hologram plane, and vice-versa. This constrained sampling is an issue when the hologram and image planes are of different sizes, especially for near-eye displays which may use spherical wave illumination for supporting wide field-of-view [Maimone et al. 2017; Shi et al. 2017].

One can overcome the sampling limitation by employing a two-step Fresnel propagation using an intermediate observation plane to effectively decouple the sampling on both hologram and image planes [Okada et al. 2013]. For a sufficiently large distance of the intermediate plane from the hologram plane, we can further simplify the computation by employing Fraunhofer diffraction. The Fraunhofer-Fresnel two-step propagation results in optical wave field on the image plane as obtained by:

$$U_I(x, y) = \underbrace{\frac{1}{\lambda^2 D(L+D)} \exp\left\{\frac{jk}{2(L+D)}[x^2 + y^2]\right\}}_{E_3} \tag{16}$$

$$\mathcal{F}\left\{\underbrace{\exp\left\{\frac{jk}{-2D}[\zeta^2 + \eta^2]\right\}}_{E_2} \mathcal{F}^{-1}\{U_H(\zeta, \eta)\} \underbrace{\exp\left\{\frac{jk}{2(L+D)}[\zeta^2 + \eta^2]\right\}}_{E_1}\right\},$$

where L and D are distances to the image plane and intermediate plane from the hologram plane respectively, k is the wave number, $U_H(\zeta, \eta)$ and $U_I(x,y)$ are the optical wave fields on the hologram and image plane respectively. For brevity, the above equation can be expressed as:

$$U_I(x, y) = E_3 \circ \mathcal{F}(E_2 \circ (\mathcal{F}^{-1}(U_H)) \circ E_1). \tag{17}$$

2.2 Gradient for Fourier-transform Based Propagation

We discussed in the previous paragraphs that the field in the destination plane can be obtained as $z = E_3 \circ \mathcal{F}(E_2 \circ (\mathcal{F}^{-1}U_H) \circ E_1)$ for a Fraunhofer-Fresnel two-step propagation. Following steps as detailed in the main manuscript for the gradient of the convolutional model, the gradient of the loss function Err($\Phi$) concerning $\Phi$ can be computed as:

$$\nabla \text{Err}(\Phi) = Re(-je^{-j\Phi} FE_1^* E_2^* F^\dagger E_3^* \nabla f). \tag{18}$$

2.3 Band-limited Angular Spectrum Propagation

The diffractive field from the SLM, if Fourier-analyzed across any plane, can be identified as plane waves traveling in different directions away from the hologram plane. The field amplitude across any point can be calculated as the summation of contributions of these plane waves, taking into account the phase shifts undergone during the propagation [Goodman 2005]. This is called the angular spectrum propagation of the wave field. The angular spectrum method (ASM) is equivalent to the Rayleigh-Sommerfeld solution and yield identical predictions of the diffracted wave field [Shen and Wang 2006]. The ASM propagated field $U_2(x,y;z)$ from a diffracting aperture with an input source field $U_1(x, y;0)$ can be computed as:

$$U_s(x,y;z) = \mathcal{F}^{-1}(\mathcal{F} U_1(x,y;0) \circ H). \tag{19}$$

where H is the ASM transfer function given by:

$$H(f_x, f_y; z) = \begin{cases} \exp\left[j2\pi \frac{z}{\lambda}\sqrt{1-(\lambda f_x)^2-(\lambda f_y)^2}\right], & \sqrt{f_x^2+f_y^2} < \frac{1}{\lambda} \\ 0, & \text{otherwise} \end{cases} \tag{20}$$

Further, the angular spectrum transfer function can be band-limited to avoid numerical errors due to the sampling [Matsushima and Shimobaba 2009].

As discussed in previous paragraphs, the wave field at the destination plane can be obtained as $z=F^{-1}(FU_1 \circ H)$, and the image is computed as $|z|^2$. Computing Part 2 from the Part 1 gradient computed in Equation 9 in the main manuscript yields:

$$\begin{aligned} d(\text{Err}(H)) &= Re\langle \nabla f, dz \rangle \\ &= Re\langle \nabla f, d(F^\dagger(H)(FU_1)) \rangle \\ &= Re\langle \nabla f, F^\dagger HFdU_1 \rangle \\ &= Re\langle F^\dagger H^\dagger F \nabla f, dH \rangle \\ &= Re\langle F^\dagger H * F \nabla f, dH \rangle \end{aligned} \tag{21}$$

Finally evaluating Part 3 with $U_1 = \exp^{j\Phi}$, we derive the definition of gradient of the loss function with respect to the phase $\Phi$ as follows:

$$d(\text{Err}(\Phi)) = \text{Re}\langle F^\dagger H^* F \nabla f, d(e^{j\phi})\rangle \qquad (22)$$
$$= \text{Re}\langle -je^{-j\phi} F^\dagger H^* F \nabla f, d(\phi)\rangle$$

Since the phase $\Phi$ is real valued, the above inner-product definition can be read as:

$$d(\text{Err}(\Phi)) = \langle \text{Re}(-je^{-j\phi} F^\dagger H^* F \nabla f), d(\phi)\rangle, \; \nabla \text{Err}(\Phi) = \text{Re}(-je^{-j\phi} F^\dagger H^* F \nabla f). \qquad (23)$$

2.5 Comparison with Other Gradient Definitions

Note that the Wirtinger gradient definitions for various propagation models are coherent with the other definitions. For example, we consider the gradients derived by Fienup [Fienup 1993] for an l2 error metric. For the squared difference in intensities (squared magnitudes), the derivative with respect to a parameter p is defined as follows $$\frac{\partial E}{\partial p} = 4\text{Re}\left(\sum_{x_1} \frac{\partial g(x_1)}{\partial p} \{P^*[|G(u)|^2 G^*(u) - |F(u)|^2 G^*(u)]\}^*\right), \qquad (24)$$

where g(x) is the optical wavefront immediately after the input plane, G(u) is the wavefront at the detector plane, P is the propagation function and |F(u)| is the magnitude of the complex optical field at the detector. The above equation can be reformulated as $$\frac{\partial E}{\partial p} = \text{Re}\left(\sum_{x_1} \frac{\partial g(x_1)}{\partial p} \{P^*[2(|G(u)|^2 - |F(u)|^2) \cdot 2G^*(u)]\}^*\right). \qquad (25)$$

It can be observed that the above formulation is consistent with the Wirtinger derivatives defined in the main manuscript, where $[2(|G(u)|^2-|F(u)|^2) \cdot 2 G(u)]$ form Part 1 of Equation 9 defined in the main manuscript. Applying inverse propagation to the above equation and taking its conjugate becomes Part 2 of the chain rule, and finally multiplying with $$\frac{\partial g(x)}{\partial p}$$

for any parameter p; in our case phase $\phi$, where $g(x) = \exp(j\phi)$; completes Part 3 of Equation 9.

3 Optimizing for 3D Holograms

The proposed Wirtinger holography framework can be extended to computing 3D holograms in a multi-layered or multi-focal approach. Given a 3D model or the scene data, one can voxelize and remap it into multiple depth planes. The hologram corresponding to each depth plane can be computed separately and all holograms can be later superposed to generate a complex hologram of the 3D scene. However, such an approach might not result in the optimal 2D phase pattern that generates the underlying 3D scene. Another approach is to jointly optimize for all depth planes to generate the corresponding optimal 2D hologram, which, however, is a challenging problem, as we will highlight next.

Figure 15:
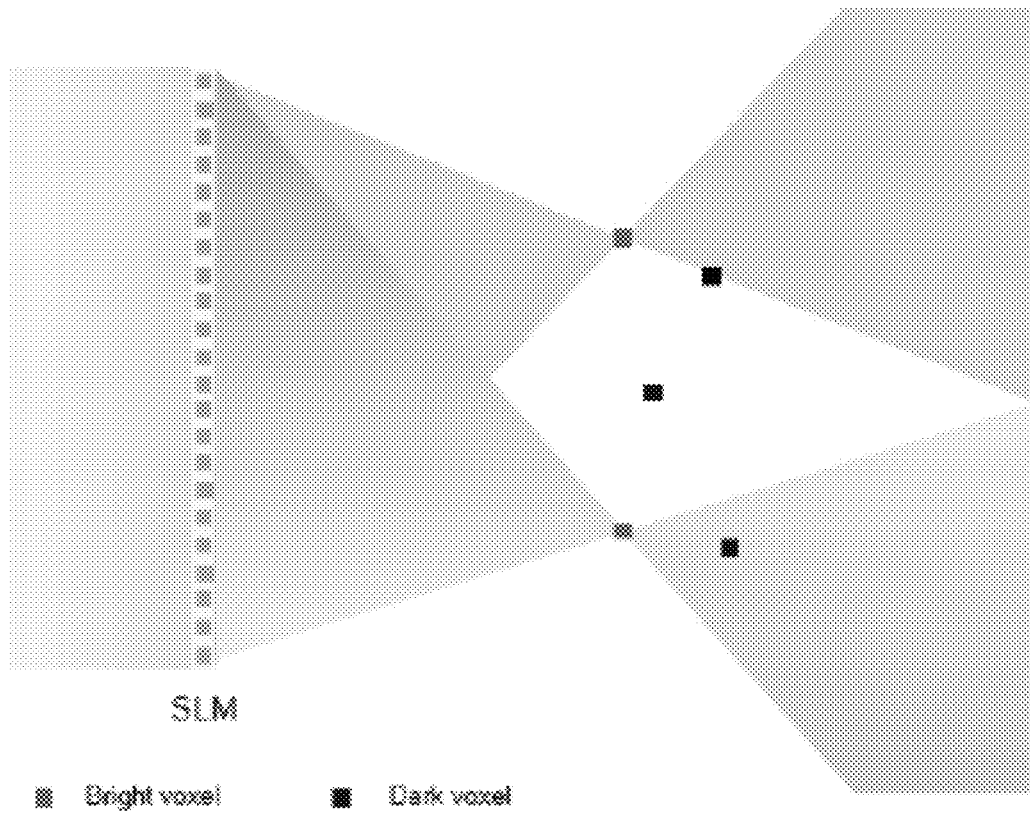
FIG. 15 illustrates complications in computing a high-quality 3D hologram. It is difficult to simultaneously create closely spaced bright and dark voxels in space with high fidelity. Creating a dark voxel immediately after a bright voxel, for any 3D hologram, requires rapid change in phase and is infeasible for a free space propagation.

As shown in FIG. 15, let us suppose we have to create a few bright voxels and a few dark voxels in a 3D volume. When the SLM is illuminated by a collimated beam, the SLM pixels diffract light to focus at points in space to create the bright voxels. Observe that a dark voxel that escapes any of the diffracted light paths are not difficult to create. However, it is difficult or impossible to create a dark spot in space immediately after creating a focused bright spot. This requires the phase of light to change very rapidly in between the bright and dark voxels, which is physically infeasible for a free space propagation. Therefore, simultaneously creating a 3D volume with rapidly varying intensity is a difficult problem. However, one can generate good quality 3D holograms for relatively less complicated scenes, but most often, all 3D holograms suffer from noise and loss in contrast due to the above-mentioned problem.

Figure 16:
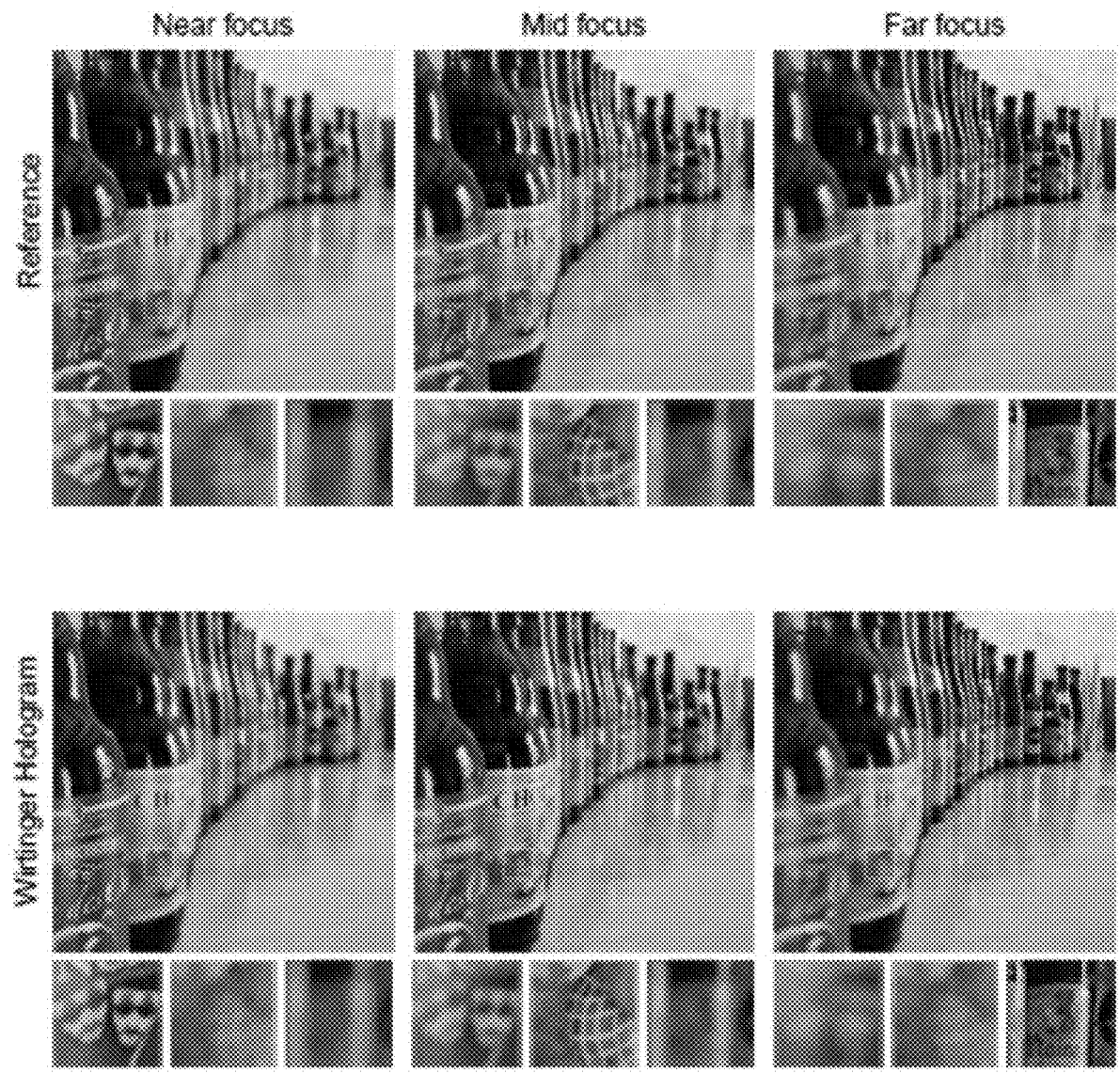
FIG. 16 illustrates simulated holograms for a 3D scene generated using fast depth switching and dynamic global scene focus for an assumed eye tracked position. Observe that the depth of field effects are appropriately represented without compromising on the holographic image quality. The depth of the above scene is scaled to make the near distance at 200 mm and far distance at 500 mm. The images are from the Lytro dataset.

Computing high quality holograms by jointly optimizing for all depth planes using our Wirtinger holography framework also suffer the above-mentioned problem, since if the depth planes are densely spaced, the optimizer forces light to change its phase rapidly while propagating, to simultaneously create closely spaced bright and dark voxels which are sometimes physically not feasible. Therefore the optimal phase hologram that is generated might contain noise which can degrade the image quality in comparison to 2D holograms. Although all 3D holographic rendering methods suffer from these problems, the holograms computed using full Fresnel diffraction integral without paraxial approximation and heuristic encoding schemes might produce fewer artifacts than optimizing for dense focal stack of 3D scene data. However, since the eye can only focus at one focal plane at a time, one can render holographic imagery at the eye accommodation plane by changing the scene focus globally. This needs to be accompanied by an eye tracker. Note, that although the depth detection capability progressively degrades with retinal eccentricity [Kim et al. 2017], object points which are closely spaced in the region where is eye is foveated suffer if not presented with an accurate depth of field blur [Maimone et al. 2017]. However, such regions can be addressed by providing the depth of field blur in the image space [Cholewiak et al. 2017]. FIG. 16 shows simulated hologram results generated by our framework for a 3D scene by the method of dynamic global scene focus. Notice that the depth of field blur is appropriately represented without compromising on the image quality. Jointly optimizing for all depth planes to generate an artifact-free full 3D hologram remains an exciting direction for future work.

4 Additional Prototype Details

Figure 17:
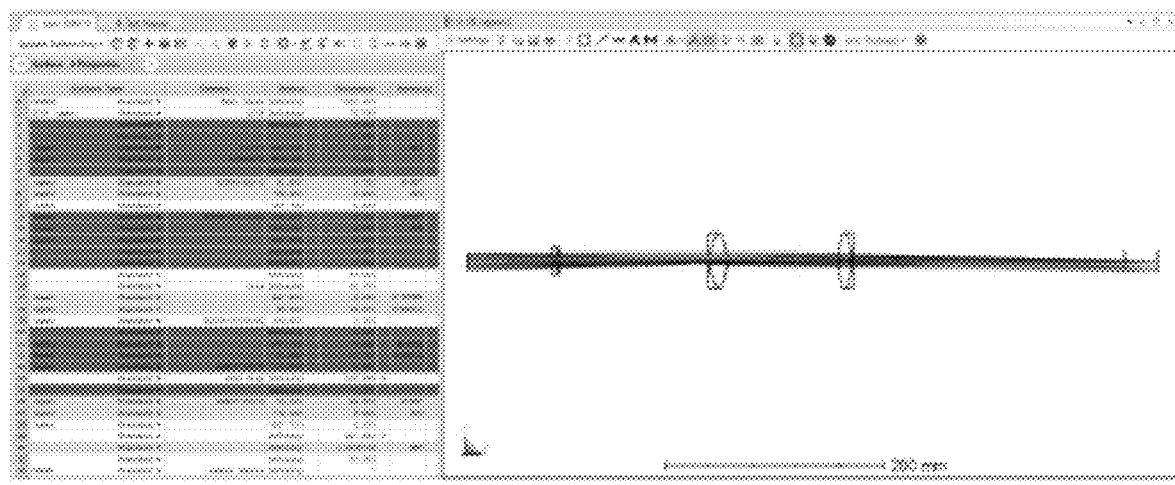
FIG. 17 illustrates an alternative optical design of the prototype near-eye display. Note that the laser source and its corresponding collimating optics are not shown in FIG. 17.

We built our bench-top prototype using cage system mounting. The optics are adjusted for an image plane distance of about 200 mm from the SLM. A Canon Rebel T6i DSLR camera is used to capture the holograms, without any camera lens present, but instead using a combination of two diffractive achromatic lenses as an eyepiece. FIG. 17 shows the layout of our optical design.

We use red, green, and blue single-mode fiber lasers that are controlled by a Thorlabs LDC205C Laser Diode Controller, sequentially changing the three colors. The exposure of the imaging camera and the laser intensity are adjusted once based on the laser power. All capture settings are kept constant per experiments.

5 Additional Analysis of Implementation

5.1 Initialization and Termination criteria

Here we discuss the initialization and termination criteria for the Wirtinger holography framework.

To solve Equation 8 of the main manuscript, we start the optimization process with an initial guess of the phase value $\phi$, which could either be a random phase or a carefully crafted phase. As mentioned in the main manuscript, carefully initializing the optimizer results in faster convergence compared to random (or shallow random) initialization. It can be easily understood from the main manuscript that the optimizer continuously searches for the optimal phase hologram for a given target intensity (image). However, one must note that there can be several phase holograms that can produce a given target intensity, making our objective function an extremely non-convex problem with several local minima. Therefore, initializing with a random phase distribution, intuitively, expands the search space for determining an optimal phase hologram. Owing to a larger domain of possible phase holograms, the particular choice of initial phase value may affect the convergence speed and numerical stability.

Let us now consider one pixel on the hologram (SLM) plane. The complex amplitude of the hologram pixel constitutes a unit amplitude and a phase value lying in the range $[0, 2\pi]$. In other words, the complex amplitude of the hologram pixel can lie anywhere on a unit circle. Suppose if the phase is known to lie within a certain range $[\alpha, \beta]$, the correct complex number determining the complex amplitude of the hologram pixel must lie on an arc of the unit circle which is defined by the angles $\alpha$ and $\beta$.

Figure 18:
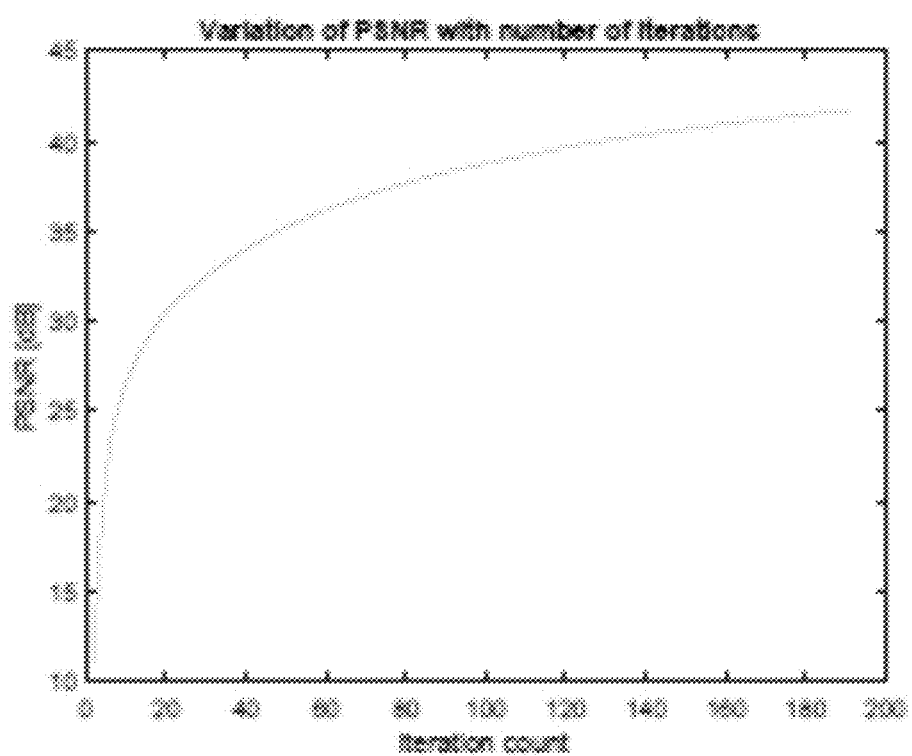
FIG. 18 illustrates PSNR values plotted against number of iterations for Wirtinger holography optimization for a randomly initialized phase.

In our case, the possibility of the range of phase values for each hologram pixel remains unclear. However, given the knowledge of some initial phase value producing the target intensity pattern, it is reasonable to assume the optimal phase value might lie somewhere close to the initial phase value. Initializing the optimizer with a carefully crafted phase, for example, a few iterations of Gerchberg-Saxton algorithm or double-phase encoding, thus offers the promise of finding optimal phase faster. However, note that even with this additional information, the problem remains non-convex and cannot directly be efficiently solved. This can be reflected in the runtime values reported in the main manuscript, that careful initialization offers about 10-15 s of speedup, but still takes a reasonable amount of time to achieve convergence. FIG. 18 shows the PSNR values with iteration count for our framework for a randomly initialized phase, and it can be observed that the PSNR improves very quickly initially, and then slowly increases with an increasing number of iterations. For the results reported in the main manuscript, we terminate the optimizer once the PSNR values reach convergence.

5.2 Additional Simulation Results

Figure 19:
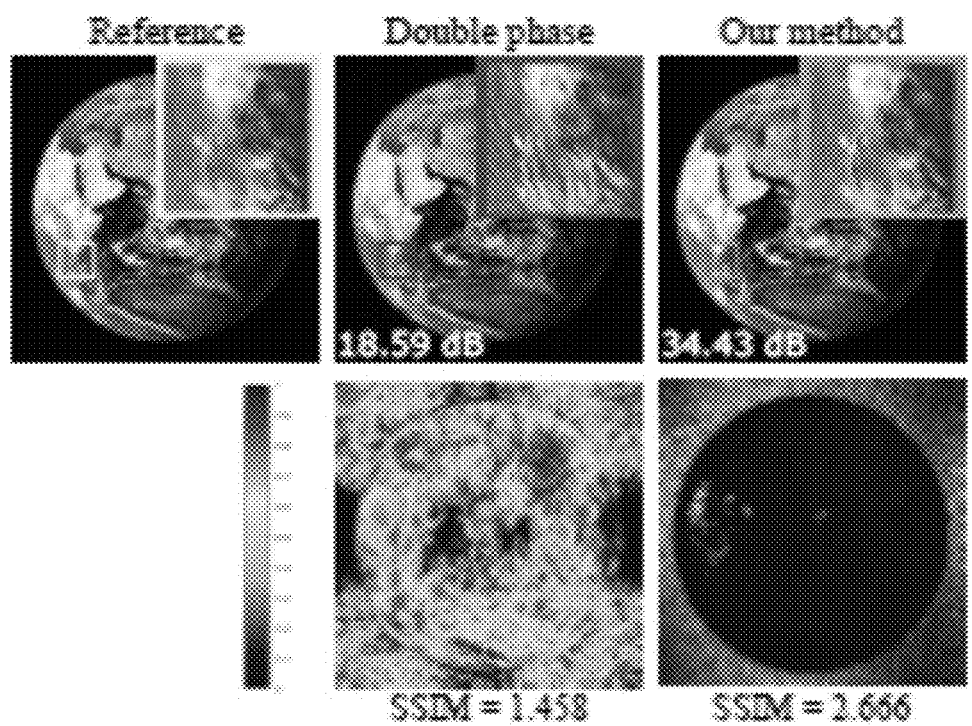
FIG. 19 illustrates the probability of detection of errors for the simulated image also shown in FIG. 10. Note that the Wirtinger holograms produce much less perceptual error as compared to that of double phase encoding method.

As mentioned in the main manuscript, Wirtinger holography eliminates much of the ringing artifacts and generates high quality holographic reconstructions in comparison to the recently demonstrated modified GS and double phase encoding phase hologram generation algorithms. FIG. 19 compares in simulation double phase encoding phase holograms and Wirtinger holograms, and present SSIM error maps as an indication of the probability of perceptually detecting ringing errors in the reconstructed image.

5.3 Cascaded Holograms

Figure 20:
FIG. 20 illustrates a comparison of holographic images from a cascade of two low-resolution SLMs with hologram reconstructions of both double-phase and Wirtinger holograms from a high-resolution SLM. Note that the cascaded low-resolution holograms are significantly better in quality compared to high resolution double phase holograms.

In the main manuscript, we show that a cascaded SLM setup can generate super resolved holographic images. FIG. 20 presents simulated images comparing holographic reconstructions of Wirtinger holograms obtained from a cascade of two low resolution 960×540 phase-only SLMs, with the simulated holographic images of both double-phase and Wirtinger holograms obtained from a single high resolution 1920×1080 phase-only SLM. Note that the holographic reconstruction obtained from a cascade of two low-resolution SLMs is super resolved in comparison to the holographic image obtained from a high-resolution double phase hologram. However, Wirtinger holograms from a single high-resolution SLM is better in quality compared to the holographic images from the cascaded low-resolution SLM.

5.4 Oversampled Phase Retrieval for Imaging

To further validate the flexibility of the proposed method, we also apply it to phase retrieval for imaging in Table 1. We adopt the 4×oversampled phase retrieval problem setting discussed in [Metzler et al. 2018] without noise added in our case. We compare the baseline methods discussed in [Qian et al. 2017] and [Metzler et al. 2018] on a set of 10 standard images. Please see both references for additional details on the individual methods.

TABLE 1

| Oversampled Phase Retrieval for Imaging | |
|---|---|
| Method | PSNR [dB] |
| HIO | 35.52 |
| AltGD | 35.85 |
| TWF | 35.33 |
| MTWF | 35.33 |
| BSG | 35.33 |
| This method | 36.34 |

6 Additional Experimental Validation 6.1 Zero-order Diffraction Beam

We use Holoeye LETO-1 phase-only Spatial Light Modulator (SLM) with a 6.4 µm pixel pitch and a 93% pixel fill factor. The fill factor describes the size of the non-functional dead area between two adjacent pixels of the SLM. The light that is incident on these dead areas is not modulated by the SLM and hence results in a zero-order diffraction beam (ZOD) on the optical axis. This ZOD introduces a high intensity illumination that distorts the desired light profile and undermines the hologram reconstruction quality.

Figure 21:
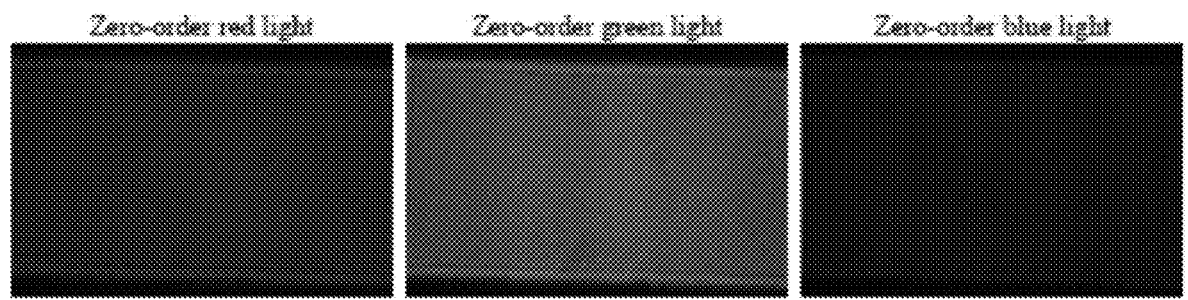
FIG. 21 illustrates zero order diffracted light from the SLM for all three red, green and blue color lasers.
Figure 22:
FIG. 22 illustrates a simulation of zero order filtering: Filtering the Zero order light improves the holographic image quality significantly.
Figure 22:
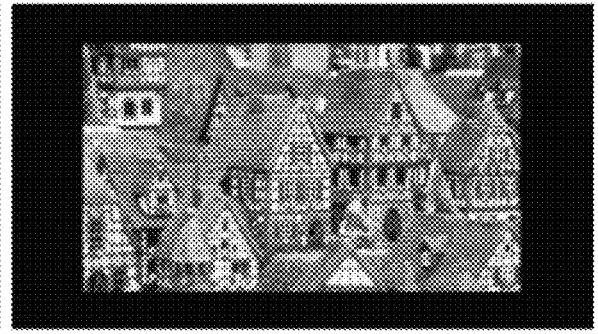

A common solution to bypass the ZOD effects is to shift the illumination away from the optical axis, but this reduces the diffraction efficiency. To maintain high diffraction efficiency, we use an on-axis illumination in our hardware setup. FIG. 21 presents images from our prototype display highlighting the zero-order diffracted light across all three color channels. Note that this zero-order pattern is a constant pattern across all the holographic images, causing deterioration in the image quality. As shown in FIG. 22, if the ZOD is eliminated, the quality of Wirtinger holograms improve significantly.

6.2 SLM Phase Patterns

Figure 23:
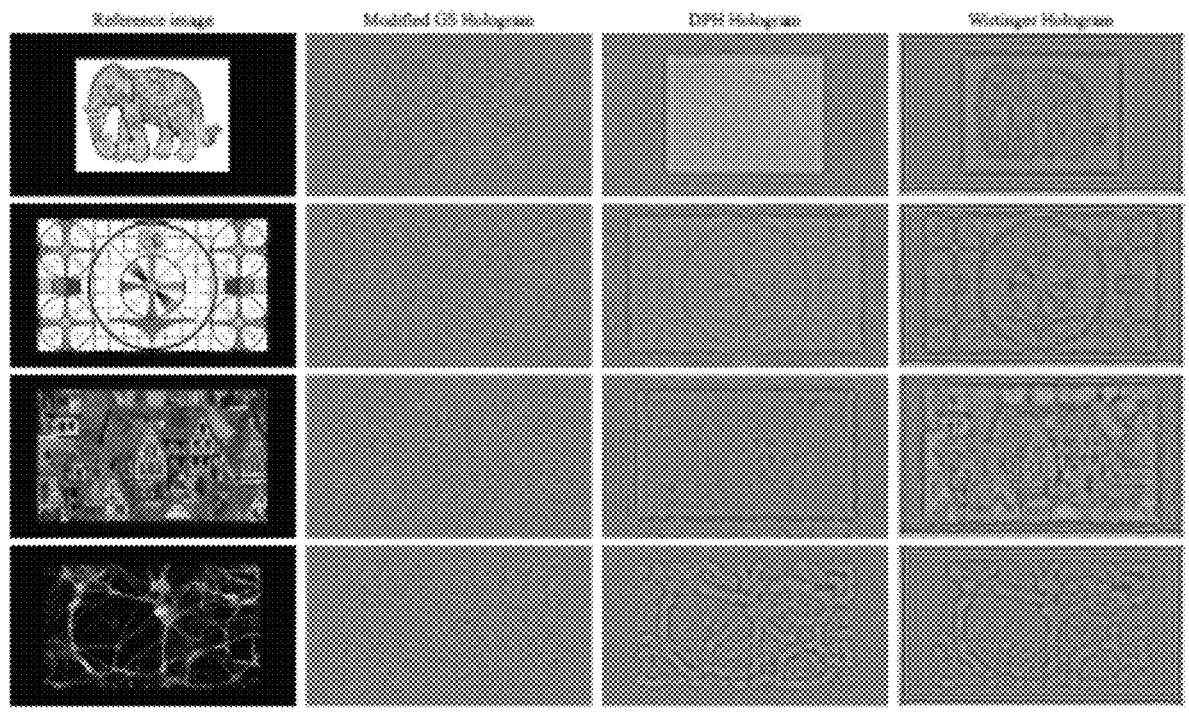
FIG. 23 illustrates phase patterns of green channel for the images presented in FIG. 13.

We show in FIG. 23 the SLM phase patterns for the green laser of 517 nm used in our experimental setup for the phase-only hologram results presented in the main manuscript.

6.3 Hardware Prototype Results

Figure 24:
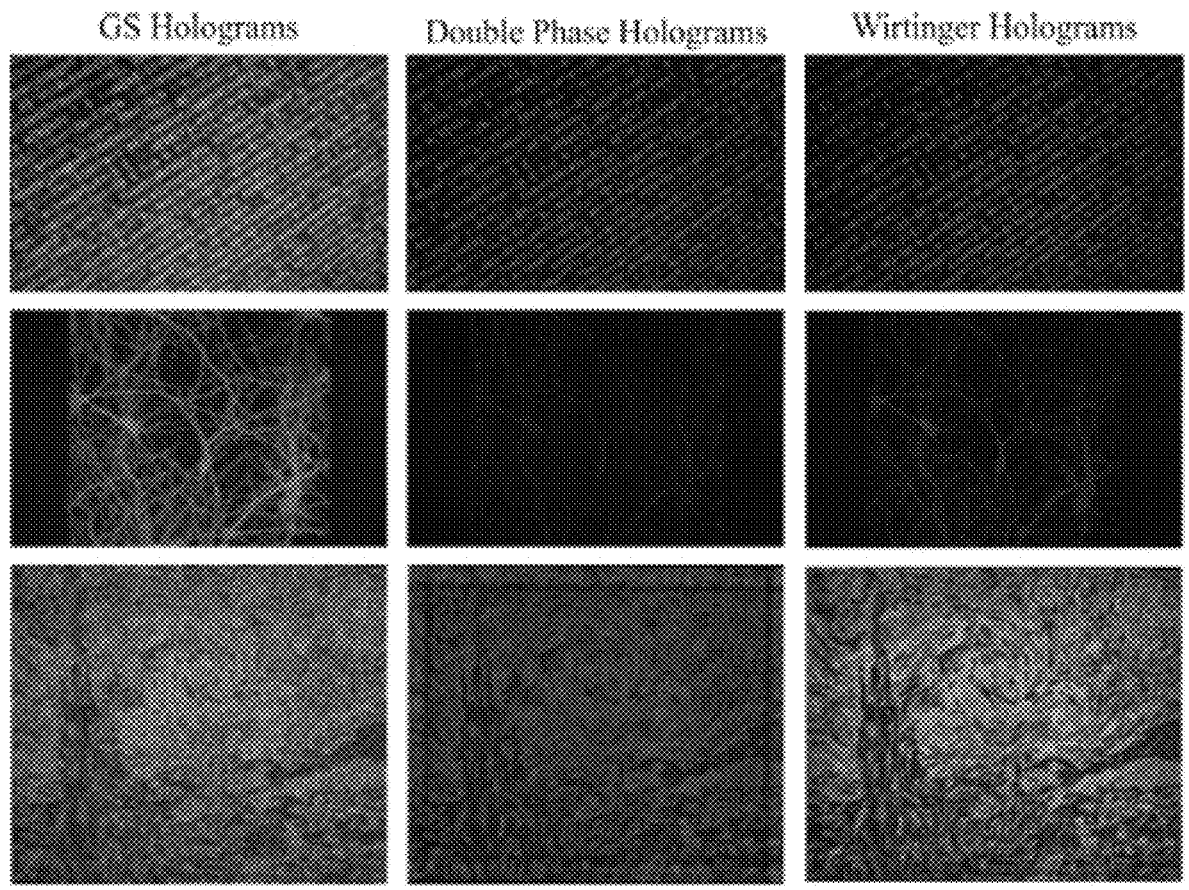
FIG. 24 illustrates results reconstructed by modified GS holograms, Double phase encoding of Fresnel holograms, and Wirtinger Holograms. The neurons image was captured by Karthik Krishnamurthy © MBF Bioscience.
Figure 25:
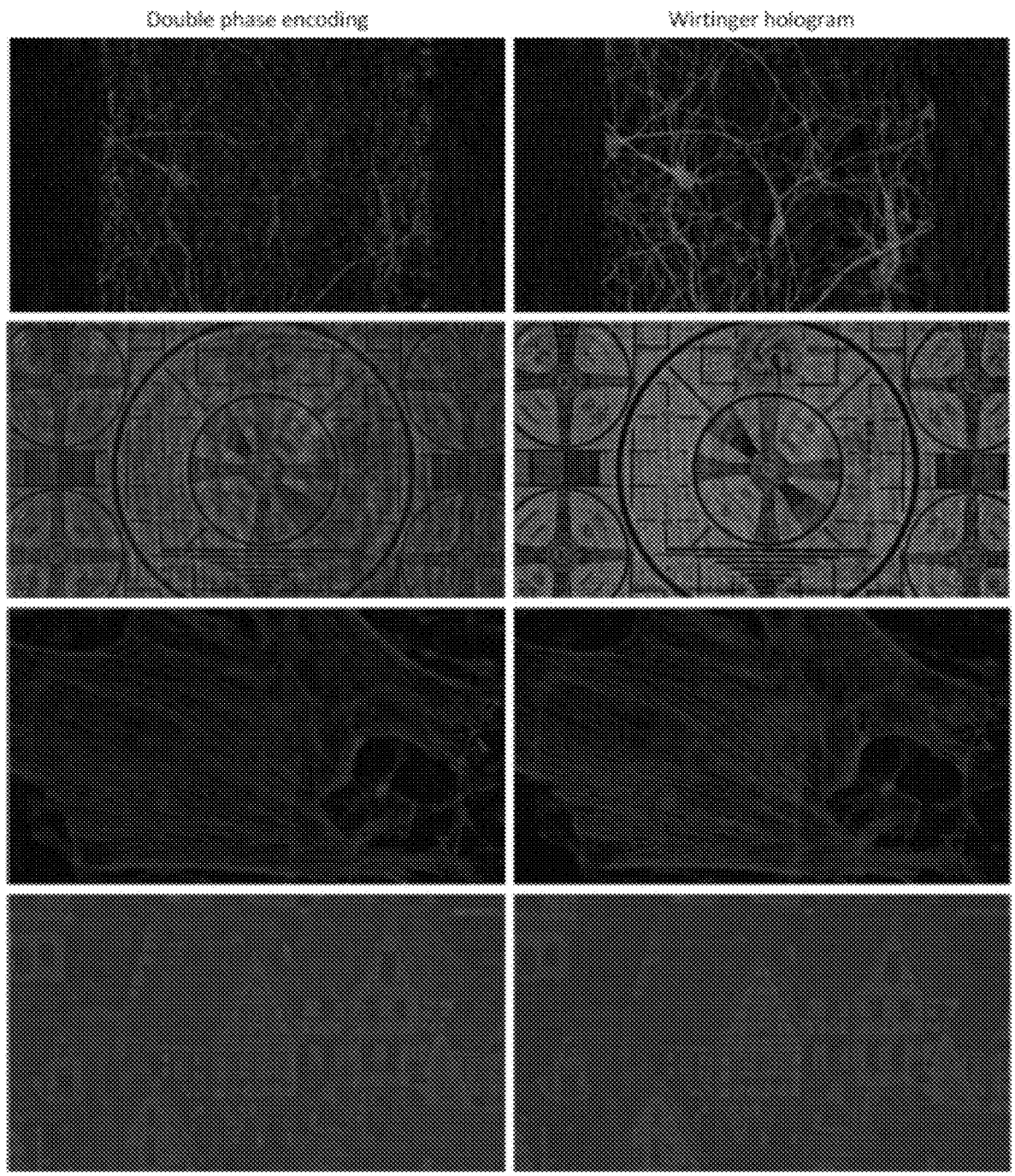
FIG. 25 illustrates Additional comparison of single-color results generated by double phase encoding (left) and Wirtinger Holograms (right).

We present several holographic images reconstructed on our prototype holographic display, other than the ones presented in the main manuscript, in FIG. 24 and FIG. 25. Wirtinger holograms feature more detail, higher resolution, and higher light efficiency.

The disclosure of each of the following references is hereby incorporated herein by reference in its entirety.

REFERENCES

Martin Abadi, Paul Barham, Jianmin Chen, Zhifeng Chen, Andy Davis, Jeffrey Dean, Matthieu Devin, Sanjay Ghemawat, Geoffrey Irving, Michael Isard, et al. 2016. Tensorflow: A system for large-scale machine learning. In 12th{USENIX} Symposium on Operating Systems Design and Implementation ({OSDI}16). 265-283.

Lukas Ahrenberg, Philip Benzie, Marcus Magnor, and John Watson. 2008. Computer generated holograms from three dimensional meshes using an analytic light transport model. Applied optics 47, 10 (2008), 1567-1574.

S. Bahmani and J. Romberg. 2017. Phase Retrieval Meets Statistical Learning Theory: A Flexible Convex Relaxation. In Proceedings of the 20th International Conference on Artificial Intelligence and Statistics (Proceedings of Machine Learning Research), Aarti Singh and Jerry Zhu (Eds.), Vol. 54. PMLR, Fort Lauderdale, Fla., USA, 252-260.

R Bates. 1982. Fourier phase problems are uniquely solvable in mute than one dimension. I: Underlying theory. Optik (Stuttgart) 61 (1982), 247-262.

Heinz H Bauschke, Patrick L Combettes, and D Russell Luke. 2003. Hybrid projection-reflection method for phase retrieval. JOSA A 20, 6 (2003), 1025-1034.

Muharrem Bayraktar and Meriç Özcan. 2010. Method to calculate the far field of three-dimensional objects for computer-generated holography. Applied optics 49, 24 (2010), 4647-4654.

Stephen A Benton and V Michael Bove Jr. 2008. Holographic imaging. John Wiley & Sons.

Marco Bevilacqua, Aline Roumy, Christine Guillemot, and Marie Line Alberi-More1.2012. Low-complexity single-image super-resolution based on nonnegative neighbor embedding. (2012).

Emmanuel J Candes, Xiaodong Li, and Mandi Soltanolkotabi. 2015. Phase retrieval via Wirtinger flow: Theory and algorithms. IEEE Transactions on Information Theory 61, 4 (2015), 1985-2007.

Emmanuel J Candes, Thomas Strohmer, and Vladislav Voroninski. 2013. Phaselift: Exact and stable signal recovery from magnitude measurements via convex programming. Communications on Pure and Applied Mathematics 66, 8 (2013), 1241-1274.

Praneeth Chakravarthula, David Dunn, Kaan Akşit, and Henry Fuchs. 2018. Focusar: Auto-focus augmented reality eyeglasses for both real world and virtual imagery. IEEE transactions on visualization and computer graphics 24, 11 (2018), 2906-2916.

J-S Chen and D P Chu. 2015. Improved layer-based method for rapid hologram generation and real-time interactive holographic display applications. Optics express 23, 14 (2015), 18143-18155.

Rick H-Y Chen and Timothy D Wilkinson. 2009. Computer generated hologram from point cloud using graphics processor. Applied optics 48, 36 (2009), 6841-6850.

Steven A Cholewiak, Gordon D Love, Pratul P Srinivasan, Ren Ng, and Martin S Banks. 2017. ChromaBlur: Rendering chromatic eye aberration improves accommodation and realism. ACM Transactions on Graphics (TOG) 36, 6 (2017), 210.

James R Fienup. 1982. Phase retrieval algorithms: a comparison. Applied optics 21, 15 (1982), 2758-2769.

James R Fienup. 1993. Phase-retrieval algorithms for a complicated optical system. Applied optics 32, 10 (1993), 1737-1746.

Ralph W Gerchberg. 1972. A practical algorithm for the determination of the phase from image and diffraction plane pictures. Optik35 (1972), 237-246. Tom Goldstein and Christoph Studer. 2018. PhaseMax: Convex phase retrieval via basis pursuit. IEEE Transactions on Information Theory (2018).

R A Gonsalves. 1976. Phase retrieval from modulus data. JOSA 66, 9 (1976), 961-964.

Joseph W Goodman. 2005. Introduction to Fourier optics. Roberts and Company Publishers.

Felix Heide, Douglas Lanman, Dikpal Reddy, Jan Kautz, Kari Pulli, and David Luebke. 2014. Cascaded displays: spatiotemporal super resolution using offset pixel layers. ACM Transactions on Graphics (TOG) 33, 4 (2014), 60.

C K Hsueh and A A Sawchuk. 1978. Computer-generated double-phase holograms. Applied optics 17, 24 (1978), 3874-3883.

Fu-Chung Huang, Kevin Chen, and Gordon Wetzstein. 2015a. The light field stereoscope: immersive computer graphics via factored near-eye light field displays with focus cues. ACM Transactions on Graphics (TOG) 34, 4 (2015), 60.

Jia-Bin Huang, Abhishek Singh, and Narendra Ahuja. 2015b. Single Image Super-Resolution From Transformed Self-Exemplars. In Proceedings of the IEEE Conference on Computer Vision and Pattern Recognition. 5197-5206.

Jia, Juan Liu, Guofan Jin, and Yongtian Wang. 2014. Fast and effective occlusion culling for 3D holographic displays by inverse orthographic projection with low angular sampling. Applied optics 53, 27 (2014), 6287-6293.

Hwi Kim, Joonku Hahn, and Byoungho Lee. 2008. Mathematical modeling of triangle-mesh-modeled three-dimensional surface objects for digital holography. Applied optics 47, 19 (2008), D117-D127.

R G Lane. 1991. Phase retrieval using conjugate gradient minimization. journal of Modern Optics 38, 9 (1991), 1797-1813.

Douglas Lanman and David Luebke. 2013. Near-eye light field displays. ACM Transactions on Graphics (TOG) 32, 6 (2013), 220.

Detlef Leseberg and Christian Frère. 1988. Computer-generated holograms of 3-Dobjects composed of tilted planar segments. Applied optics 27, 14 (1988), 3020-3024.

L B Lesem, P M Hirsch, and J A Jordan. 1969. The kinoform: a new wavefront reconstruction device. IBM Journal of Research and Development 13, 2 (1969), 150-155.

Dong C Liu and Jorge Nocedal. 1989. On the limited memory BFGS method for largescale optimization. Mathematical programming 45, 1-3 (1989), 503-528.

Mark Lucente and Tinsley A Galyean. 1995. Rendering interactive holographic images. In Proceedings of the 22nd annual conference on Computer graphics and interactive techniques. ACM, 387-394.

Mark E Lucente. 1993. Interactive computation of holograms using a look-up table. Journal of Electronic Imaging 2, 1 (1993), 28-34.

D Russell Luke. 2004. Relaxed averaged alternating reflections for diffraction imaging. Inverse problems 21, 1 (2004), 37.

Andrew Maimone, Andreas Georgiou, and Joel S Kollin. 2017. Holographic near-eye displays for virtual and augmented reality. ACM Transactions on Graphics (TOG) 36, 4 (2017), 85.

Stefano Marchesini, Yu-Chao Tu, and Hau-tieng Wu. 2016. Alternating projection, ptychographic imaging and phase synchronization. Applied and Computational Harmonic Analysis 41, 3 (2016), 815-851.

D. Martin, C. Fowlkes, D. Tal, and J. Malik. 2001. A Database of Human Segmented Natural Images and its Application to Evaluating Segmentation Algorithms and Measuring Ecological Statistics. In Proc. 8th Intl Conf. Computer Vision, Vol. 2. 416-423.

Nobuyuki Masuda, Tomoyoshi Ito, Takashi Tanaka, Atsushi Shiraki, and Takashige Sugie. 2006. Computer generated holography using a graphics processing unit. Optics Express 14, 2 (2006), 603-608.

Kyoji Matsushima. 2005. Computer-generated holograms for three-dimensional surface objects with shade and texture. Applied optics 44, 22 (2005), 4607-4614.

Kyoji Matsushima and Sumio Nakahara. 2009. Extremely high-definition full-parallax computer-generated hologram created by the polygon-based method. Applied optics 48, 34 (2009), H54-H63.

Kyoji Matsushima, Masaki Nakamura, and Sumio Nakahara. 2014. Silhouette method for hidden surface removal in computer holography and its acceleration using the switch-back technique. Optics express 22, 20 (2014), 24450-24465.

Yifan Peng, Xiong Dun, Qilin Sun, and Wolfgang Heidrich. 2017. Mix-and-match holography. ACM Transactions on Graphics (2017). Christoph Petz and Marcus Magnor. 2003. Fast hologram synthesis for 3D geometry models using graphics hardware. In Proc. SPIE, Vol. 5005. 266-275.

Reinhold Remmert. 2012. Theory of complex functions. Vol. 122. Springer Science &Business Media.

Mark Schmidt. 2005. minFunc: unconstrained differentiable multivariate optimization in Matlab. Software available at http://www.cs.ubc.cahschmidtm/Software/minFunc.htm (2005).

Liang Shi, Fu-Chung Huang, Ward Lopes, Wojciech Matusik, and David Luebke. 2017. Near-eye light field holographic rendering with spherical waves for wide field of view interactive 3d computer graphics. ACM Transactions on Graphics (TOG) 36, 6 (2017), 236.

Quinn Y J Smithwick, James Barabas, Daniel E Smalley, and V Michael Bove. 2010. Interactive holographic stereograms with accommodation cues. In Practical Holography XXIV: Materials and Applications, Vol. 7619. International Society for Optics and Photonics, 761903.

Tullio Tommasi and Bruno Bianco. 1993. Computer-generated holograms of tilted planes by a spatial frequency approach. JOSA A 10, 2 (1993), 299-305.

John Stephen Underkoffler. 1991. Toward accurate computation of optically reconstructed holograms. Ph.D. Dissertation. Massachusetts Institute of Technology.

Zhou Wang, Eero P Simoncelli, and Alan C Bovik. 2003. Multiscale structural similarity for image quality assessment. In The Thirty-Seventh Asilomar Conference on Signals, Systems & Computers, 2003, Vol. 2. IEEE, 1398-1402.

James P Waters. 1966. Holographic image synthesis utilizing theoretical methods. Applied physics letters 9, 11 (1966), 405-407.

Zaiwen Wen, Chao Yang, Xin Liu, and Stefano Marchesini. 2012. Alternating direction methods for classical and ptychographic phase retrieval. Inverse Problems 28, 11 (2012), 115010.

Masahiro Yamaguchi, Hideshi Hoshino, Toshio Honda, and Nagaaki Ohyama. 1993. Phase-added stereogram: calculation of hologram using computer graphics technique. In Proc. SPIE, Vol. 1914. 25-31.

Hiroshi Yoshikawa, Takeshi Yamaguchi, and Hiroki Uetake. 2016. Image quality evaluation and control of computer-generated holograms. In Practical Holography XXX: Materials and Applications, Vol. 9771. International Society for Optics and Photonics, 97710N.

Roman Zeyde, Michael Elad, and Matan Protter. 2010. On single image scale-up using sparse-representations. In International conference on curves and surfaces. Springer, 711-730.

Hao Zhang, Yan Zhao, Liangcai Cao, and Guofan Jin. 2015. Fully computed holographic stereogram based algorithm for computer-generated holograms with accurate depth cues. Optics express 23, 4 (2015), 3901-3913.

Hao Zhang, Yan Zhao, Liangcai Cao, and Guofan Jin. 2016. Layered holographic stereogram based on inverse Fresnel diffraction. Applied optics 55, 3 (2016), A154-A159.

Jingzhao Zhang, Nicolas Pégard, Jingshan Zhong, Hillel Adesnik, and Laura Waller. 2017. 3D computer-generated holography by non-convex optimization. Optica 4, 10 (2017), 1306-1313.

Richard Zhang, Phillip Isola, Alexei A Efros, Eli Shechtman, and Oliver Wang. 2018. The unreasonable effectiveness of deep features as a perceptual metric. arXiv preprint (2018).

Yan Zhao, Liangcai Cao, Hao Zhang, Dezhao Kong, and Guofan Jin. 2015. Accurate calculation of computer-generated holograms using angular-spectrum layer-oriented method. Optics express 23, 20 (2015), 25440-25449.

Wilhelm Wirtinger. On the formal theory of the functions of more complex versions. Mathematical Annals, volume 97, number 1, pages =357-375, Springer (1927).

Joohwan Kim, Qi Sun, Fu-Chung Huang, Li-Yi Wei, David Luebke, and Arie Kaufman. 2017. Perceptual studies for foveated light field displays. arXiv preprint arXiv: 1708.06034 (2017).

Kyoji Matsushima and Tomoyoshi Shimobaba. 2009. Band-limited angular spectrum method for numerical simulation of free-space propagation in far and near fields. Optics express 17, 22 (2009), 19662-19673.

Christopher A Metzler, Philip Schniter, Ashok Veeraraghavan, and Richard G Baraniuk. 2018. prDeep: Robust Phase Retrieval with a Flexible Deep Network. In International Conference on Machine Learning. 3498-3507.

Naohisa Okada, Tomoyoshi Shimobaba, Yasuyuki Ichihashi, Ryutaro Oi, Kenji Yamamoto, Minoru Oikawa, Takashi Kakue, Nobuyuki Masuda, and Tomoyoshi Ito. 2013. Band-limited double-step Fresnel diffraction and its application to computer-generated holograms. Optics express 21, 7 (2013), 9192-9197.

Cheng Qian, Xiao Fu, Nicholas D Sidiropoulos, Lei Huang, and Junhao Xie. 2017. Inexact alternating optimization for phase retrieval in the presence of outliers. IEEE Transactions on Signal Processing 65, 22 (2017), 6069-6082.

Fabin Shen and Anbo Wang. 2006. Fast-Fourier-transform based numerical integration method for the Rayleigh-Sommerfeld diffraction formula. Applied optics 45, 6 (2006), 1102-1110.

Liang Shi, Fu-Chung Huang, Ward Lopes, Wojciech Matusik, and David Luebke. 2017. Near-eye light field holographic rendering with spherical waves for wide field of view interactive 3d computer graphics. ACM Transactions on Graphics (TOG) 36, 6 (2017), 236.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for digital holography, the method comprising:
    modeling a hologram using a forward propagation model that models propagation of a light field from a hologram plane to an image plane;
    computing the hologram as a solution to an optimization problem that is based on the model, wherein computing the hologram as a solution to an optimization problem includes evaluating holograms as potential solutions to the optimization problem by computing an approximation of a gradient of a penalty function with respect to amplitude of a complex wave field of a reconstructed image on the image plane using Wirtinger derivatives, wherein the penalty function quantifies a difference between the amplitude of the complex wave field of the reconstructed image on the image plane and an amplitude of a complex wave field of the target image on the image plane, adjusting a phase of a spatial light modulator based on the penalty function, wherein computing an approximation of the gradient of the penalty function using Wirtinger derivatives includes computing a scaled value of field intensity on the image plane;

configuring at least one spatial light modulator using the hologram; and illuminating the spatial light modulator using a light source to create the reconstructed image.

2. The method of claim 1 wherein modeling the hologram using a forward propagation model includes modeling the hologram using an angular spectrum, Fourier, Fraunhofer, or Fresnel propagation model.

3. The method of claim 1 wherein modeling the hologram using a forward propagation model includes modeling the hologram as a spatially invariant convolution of the hologram and a lens phase function.

4. The method of claim 3 wherein the optimization problem uses a least squares optimization function.

5. The method of claim 4 wherein the least squares optimization function comprises:

$$\underset{H}{\text{minimize}} \, \||H*L|^2 - I\|_2^2,$$

where H is the hologram, L is the lens phase function, and I is the square of a target image intensity.

6. The method of claim 5 wherein the hologram comprises a phase hologram for a phase only spatial light modulator and the function $$\underset{H}{\text{minimize}} \, \||H*L|^2 - I\|_2^2$$

is approximated using the function:

$$\underset{\phi}{\text{argmin}} \, \||H*L|^2 - I\|_2^2,$$

where Φ is the phase angle of the hologram for a given object point.

7. The method of claim 6 wherein the function $$\underset{\phi}{\text{argmin}} \, \||H*L|^2 - I\|_2^2$$

is approximated using the following function:

$$\underset{\phi}{\text{argmin}} \, \||F^H(FH)(FL)|^2 - I\|_2^2,$$

where F is the Fourier transform operator and $F^H$ is the inverse Fourier transform operator.

8. The method of claim 7 wherein computing the hologram includes calculating a gradient of the function $$\underset{\phi}{\text{argmin}} \, \||F^H(FH)(FL)|^2 - I\|_2^2.$$

9. The method of claim 1 wherein configuring at least one spatial light modulator includes configuring a single phase only spatial light modulator.

10. The method of claim 1 wherein configuring at least one spatial light modulator includes configuring each of a pair of cascaded phase only spatial light modulators.

11. The method of claim 1 wherein computing the hologram includes using the penalty function to quantify error between the reconstructed image produced by a hologram H and a target image.

12. The method of claim 11 wherein the penalty function is based on perceptual accuracy or a learned perceptual similarity metric.

13. The method of claim 11 wherein the hologram comprises a phase only hologram and computing the hologram as a solution to the optimization problem comprises determining a phase angle of the hologram H that minimizes the error.

14. A system for digital holography, the system comprising:
a display device comprising:
at least one processor;
a hologram calculator implemented by the at least one processor and configured for modeling a hologram using a forward propagation model that models propagation of a light field from a hologram plane to an image plane and computing the hologram as a solution to an optimization problem that is based on the model, wherein computing the hologram as a solution to an optimization problem includes evaluating holograms as potential solutions to the optimization problem by computing an approximation of a gradient of a penalty function with respect to a complex wave field of a reconstructed image on the image plane using Wirtinger derivatives, wherein the penalty function quantifies a difference between the amplitude of the complex wave field of the reconstructed image on the image plane and an amplitude of a complex wave field of the target image on the image plane, adjusting a phase of a spatial light modulator based on the penalty function, wherein computing an approximation of the gradient of the penalty function using Wirtinger derivatives includes computing a scaled value of field intensity on the image plane;
at least one spatial light modulator;
a spatial light modulator controller for configuring the at least one spatial light modulator using the hologram; and
a light source for illuminating the at least one spatial light modulator to create the reconstructed image.

15. The system of claim 14 wherein modeling the hologram using a forward propagation model includes modeling the hologram using an angular spectrum, Fourier, Fraunhofer, or Fresnel propagation model.

16. The system of claim 14 wherein modeling the hologram using a forward propagation model includes modeling the hologram as a spatially invariant convolution of the hologram and a lens phase function.

17. The system of claim 16 wherein the optimization problem uses a least squares optimization function.

18. The system of claim 17 wherein the least squares optimization function comprises:

$$\underset{H}{\text{minimize}} \; \||H*L|^2 - I\|_2^2$$

where H is the hologram, L is the lens phase function, and r is the square of a target image intensity.

19. The system of claim 18 wherein the hologram comprises a phase hologram for a phase only spatial light modulator and the function $$\underset{H}{\text{minimize}} \; \||H*L|^2 - I\|_2^2$$

is approximated using the function:

$$\underset{\phi}{\text{argmin}} \; \||H*L|^2 - I\|_2^2,$$

where Φ is the phase angle of the hologram for a given object point.

20. The system of claim 19 wherein the function $$\underset{\phi}{\text{argmin}} \; \||H*L|^2 - I\|_2^2$$

is approximated using the following function:

$$\underset{\phi}{\text{argmin}} \; \||F^H(FH)(FL)|^2 - I\|_2^2,$$

where F is the Fourier transform operator and $F^H$ is the inverse Fourier transform operator.

21. The system of claim 20 wherein computing the hologram includes calculating a gradient of the function $$\underset{\phi}{\text{argmin}} \; \||F^H(FH)(FL)|^2 - I\|_2^2.$$

22. The system of claim 14 wherein computing the hologram includes using the penalty function to quantify error between the reconstructed image produced by a hologram H and a target image.

23. The system of claim 22 wherein the hologram comprises a phase only hologram and computing the hologram as a solution to the optimization problem comprises determining a phase angle of the hologram H that minimizes the error.

24. The system of claim 22 wherein the penalty function is based on perceptual accuracy or a learned perceptual similarity metric.

25. The system of claim 14 wherein the at least one spatial light modulator comprises a single phase only spatial light modulator.

26. The system of claim 14 wherein the at least one spatial light modulator comprises a pair of cascaded phase only spatial light modulators.

27. A non-transitory computer readable medium having stored thereon executable instructions that when executed by a processor of a computer control the computer to perform steps comprising:

modeling a hologram using a forward propagation model that models propagation of a light field from a hologram plane to an image plane;

computing the hologram as a solution to an optimization problem that is based on the model, wherein computing the hologram as a solution to an optimization problem includes evaluating holograms as potential solutions to the optimization problem by computing an approximation of a gradient of a penalty function with respect to a complex wave field of a reconstructed image on the image plane using Wirtinger derivatives, wherein the penalty function quantifies a difference between the amplitude of the complex wave field of the reconstructed image on the image plane and an amplitude of a complex wave field of the target image on the image plane, adjusting a phase of a spatial light modulator based on the penalty function, wherein computing an approximation of the gradient of the penalty function using Wirtinger derivatives computing a scaled value of field intensity on the image plane;

configuring at least one spatial light modulator using the hologram; and illuminating the spatial light modulator using a light source to create the reconstructed image.

* * * * *